(12) United States Patent
Seo et al.

(10) Patent No.: US 7,783,161 B2
(45) Date of Patent: Aug. 24, 2010

(54) METHOD AND APPARATUS FOR REPRODUCING DATA FROM RECORDING MEDIUM USING LOCAL STORAGE

(75) Inventors: Kang Soo Seo, Anyang-si (KR); Jea Yong Yoo, Seoul (KR); Byung Jin Kim, Seongnam-si (KR)

(73) Assignee: LG Electronics Inc., Seoul (KR)

( * ) Notice: Subject to any disclaimer, the term of this patent is extended or adjusted under 35 U.S.C. 154(b) by 1174 days.

(21) Appl. No.: 11/268,552

(22) Filed: Nov. 8, 2005

(65) Prior Publication Data

US 2006/0098940 A1 May 11, 2006

Related U.S. Application Data

(60) Provisional application No. 60/625,723, filed on Nov. 8, 2004, provisional application No. 60/632,645, filed on Dec. 3, 2004, provisional application No. 60/641,780, filed on Jan. 7, 2005.

(30) Foreign Application Priority Data

May 20, 2005 (KR) ................. 10-2005-0042546
Jun. 9, 2005 (KR) ................. 10-2005-0049467

(51) Int. Cl.
*H04N 7/00* (2006.01)
(52) U.S. Cl. .................. 386/95; 386/46; 386/125
(58) Field of Classification Search .............. 386/46, 386/95, 125
See application file for complete search history.

(56) References Cited

U.S. PATENT DOCUMENTS

| | | | |
|---|---|---|---|
| 5,596,565 A | | 1/1997 | Yonemitsu et al. |
| 5,644,782 A | * | 7/1997 | Yeates et al. .............. 710/10 |
| 5,778,389 A | | 7/1998 | Pruett et al. |
| 5,930,768 A | | 7/1999 | Hooban |
| 5,982,980 A | | 11/1999 | Tada |
| 6,021,438 A | | 2/2000 | Duvvoori et al. |
| 6,269,371 B1 | | 7/2001 | Ohnishi |
| 6,381,202 B1 | | 4/2002 | Shimoda |

(Continued)

FOREIGN PATENT DOCUMENTS

CA 2 373 641 9/2001

(Continued)

OTHER PUBLICATIONS

International Search Report issued May 10, 2006 in International Patent Application No. PCT/KR2005/003771.

(Continued)

*Primary Examiner*—Thai Tran
*Assistant Examiner*—Girumsew Wendmagegn
(74) *Attorney, Agent, or Firm*—Harness, Dickey & Pierce, P.L.C.

(57) ABSTRACT

A method and apparatus for reproducing data from a recording medium using a local storage is disclosed. If downloaded data is stored in the local storage and enters an updatable state, it is updated to a local storage file structure. A binding unit is formed in the updated local storage file structure, and the formed binding unit is combined with a recording medium file structure, such that a virtual package is formed. Therefore, recording medium data and/or downloaded local storage data are reproduced according to the formed virtual package.

18 Claims, 16 Drawing Sheets

U.S. PATENT DOCUMENTS

| | | |
|---|---|---|
| 6,675,382 B1 | 1/2004 | Foster |
| 6,775,803 B1 | 8/2004 | Chung et al. |
| 6,928,613 B1 | 8/2005 | Ishii et al. |
| 6,938,005 B2 | 8/2005 | Iverson et al. |
| 6,980,979 B2 | 12/2005 | Huang et al. |
| 7,039,863 B1 | 5/2006 | Caro et al. |
| 7,191,392 B1 | 3/2007 | Coar |
| 7,233,553 B2 | 6/2007 | Gotoh et al. |
| 7,349,923 B2 | 3/2008 | Spring et al. |
| 7,477,833 B2 | 1/2009 | Kato et al. |
| 7,555,483 B2 | 6/2009 | Maeda et al. |
| 7,639,923 B2 | 12/2009 | Ikeda et al. |
| 2001/0015940 A1 | 8/2001 | Yokota et al. |
| 2001/0026502 A1 | 10/2001 | Zimmer |
| 2001/0037356 A1 | 11/2001 | White et al. |
| 2002/0001395 A1 | 1/2002 | Davis et al. |
| 2002/0048224 A1 | 4/2002 | Dygert et al. |
| 2002/0143795 A1 | 10/2002 | Fletcher et al. |
| 2002/0161571 A1 | 10/2002 | Matsushima et al. |
| 2002/0194618 A1* | 12/2002 | Okada et al. ............... 725/132 |
| 2003/0041110 A1 | 2/2003 | Wenocur et al. |
| 2003/0056029 A1 | 3/2003 | Huang et al. |
| 2003/0072453 A1 | 4/2003 | Kelly et al. |
| 2003/0105743 A1 | 6/2003 | Ireton |
| 2003/0109306 A1 | 6/2003 | Karmarkar |
| 2003/0152366 A1 | 8/2003 | Kanazawa et al. |
| 2003/0163486 A1 | 8/2003 | Van Der Meulen |
| 2003/0180031 A1 | 9/2003 | Kikuchi et al. |
| 2003/0202431 A1 | 10/2003 | Kim et al. |
| 2003/0228134 A1 | 12/2003 | Kim et al. |
| 2003/0235402 A1 | 12/2003 | Seo et al. |
| 2003/0235406 A1 | 12/2003 | Seo et al. |
| 2004/0051812 A1 | 3/2004 | Hayward |
| 2004/0054541 A1 | 3/2004 | Kryze et al. |
| 2004/0078293 A1* | 4/2004 | Iverson et al. ............... 705/27 |
| 2004/0101285 A1 | 5/2004 | Seo et al. |
| 2004/0120695 A1 | 6/2004 | Tsumagari et al. |
| 2004/0199566 A1 | 10/2004 | Carlson et al. |
| 2004/0210584 A1 | 10/2004 | Nir et al. |
| 2004/0235402 A1 | 11/2004 | Bjelopavlic et al. |
| 2005/0018854 A1 | 1/2005 | Yamamoto et al. |
| 2005/0108466 A1 | 5/2005 | Takashima et al. |
| 2005/0141879 A1 | 6/2005 | Chung et al. |
| 2005/0169132 A1 | 8/2005 | Kuraoka et al. |
| 2005/0262149 A1 | 11/2005 | Jung et al. |
| 2006/0013562 A1 | 1/2006 | Sugino et al. |
| 2006/0020932 A1 | 1/2006 | Bentz et al. |
| 2006/0045481 A1 | 3/2006 | Yahata et al. |
| 2006/0051062 A1 | 3/2006 | Kusaka et al. |
| 2006/0140079 A1 | 6/2006 | Hamada et al. |
| 2006/0143666 A1 | 6/2006 | Okada et al. |
| 2006/0153535 A1 | 7/2006 | Chun et al. |
| 2006/0155790 A1 | 7/2006 | Jung et al. |
| 2006/0156354 A1 | 7/2006 | Jung et al. |
| 2006/0227973 A1 | 10/2006 | Takashima et al. |
| 2007/0006276 A1 | 1/2007 | Ashley et al. |
| 2007/0038989 A1 | 2/2007 | Newton et al. |
| 2007/0143740 A1 | 6/2007 | Hoerentrup et al. |
| 2008/0025182 A1 | 1/2008 | Seo et al. |
| 2008/0031599 A1 | 2/2008 | Ikeda et al. |

FOREIGN PATENT DOCUMENTS

| | | |
|---|---|---|
| CN | 1898742 | 1/2007 |
| CN | 1954384 | 4/2007 |
| EP | 0 101 133 A | 2/1984 |
| EP | 0 737 912 | 10/1996 |
| EP | 0 737 975 | 10/1996 |
| EP | 0 801 384 | 10/1997 |
| EP | 1 014 372 | 6/2000 |
| EP | 1 032 229 | 8/2000 |
| EP | 1 408 505 | 4/2004 |
| EP | 1 426 961 | 6/2004 |
| EP | 1 437 737 | 7/2004 |
| EP | 1 513 152 | 3/2005 |
| EP | 1 536 427 | 6/2005 |
| EP | 1 551 027 | 7/2005 |
| EP | 1 553 769 | 7/2005 |
| EP | 1 688 950 | 8/2006 |
| EP | 1 718 074 | 11/2006 |
| JP | 11-065996 | 3/1999 |
| JP | 11-249948 | 9/1999 |
| JP | 11-249963 | 9/1999 |
| JP | 11-288580 | 10/1999 |
| JP | 2002-049518 | 2/2002 |
| JP | 2002-288941 | 10/2002 |
| JP | 2004-214918 | 7/2004 |
| JP | 2006-40473 | 2/2006 |
| KR | 10-2004-039885 | 5/2004 |
| TW | 583538 | 4/2004 |
| WO | WO 95/12197 | 5/1995 |
| WO | WO 96/11446 | 4/1996 |
| WO | WO 01/67668 A1 | 9/2001 |
| WO | WO 2004/001752 | 12/2003 |
| WO | WO 2004/001754 | 12/2003 |
| WO | WO 2004/023479 | 3/2004 |
| WO | WO 2004/025651 | 3/2004 |
| WO | WO 2004/030356 | 4/2004 |
| WO | WO 2004/042723 | 5/2004 |
| WO | WO 2004/047100 | 6/2004 |
| WO | WO 2004/047104 | 6/2004 |
| WO | WO 2004/081936 | 9/2004 |
| WO | WO 2004/100048 | 11/2004 |
| WO | WO 2004/114658 | 12/2004 |
| WO | WO 2005/002220 | 1/2005 |
| WO | WO 2005/045834 | 5/2005 |
| WO | 2005/052941 A1 | 6/2005 |
| WO | WO 2005/050528 | 6/2005 |
| WO | WO 2005/055205 | 6/2005 |
| WO | WO 2005/078727 | 8/2005 |
| WO | WO 2005/079063 | 8/2005 |
| WO | WO 2005/091637 | 9/2005 |
| WO | WO 2005/124763 | 12/2005 |
| WO | WO 2006/031048 | 3/2006 |

OTHER PUBLICATIONS

International Search Report issued May 30, 2006 in International Patent Application No. PCT/KR2005/004647.
International Search Report issued Jun. 16, 2006 in corresponding International Patent Application No. PCT/KR2005/004648.
International Search Report issued Jun. 29, 2006 in corresponding International Patent Application No. PCT/KR2006/000020.
Office Action for corresponding Chinese Application No. 200580031490.0 dated Aug. 8, 2008 and English Translation thereof.
Search Report for corresponding European Application No. 05823683.7 dated Sep. 17, 2008.
Chinese Office Action and English translation dated May 8, 2009.
Russian Office Action and English translation dated Jun. 23, 2009.
Office Action for U.S. Appl. No. 11/224,245 dated May 12, 2009.
Office Action for U.S. Appl. No. 11/246,231 dated Aug. 18, 2009.
Little et al., "Forensic 3D Scene Reconstruction," Nov. 2, 1999 Sandia National Laboratories, P. 1-8 <retrieved from USDOE information bridge on May 10, 2009>.
Search Report for European patent application No. 05786904.2 dated Nov. 10, 2009.
Blu-Ray Disc Founders: "White paper Blu-ray Disc Format—2.A Logical and Audio Visual Application Format Specifications for BD-RE," Internet Citation, [Online] Aug. 1, 2004, pp. 1-26, XP007904846, retrieved from Internet: URL:http://www.blurayjukebox.com/html/blu-ray_whitepapers.html> [retrieved on Aug. 30, 2005].
Blu-Ray Disc Founders: "White paper, Blu-Ray Disc Format: General," Internet Citation, [Online] Aug. 1, 2004, pp. 1-37, XP002547994, retrieved from Internet: URL:http://www.blu-raydisc.com/Assets/Downloadablefile/general_bluraydiscformat-15263.pdf> [retrieved on Oct. 7, 2009].

Blu-Ray Disc Founders: "White paper Blu-Ray Disc Format: 3. File System Specifications for BD-RE, R, Rom," Internet Citation, [Online], Aug. 1, 2004, XP002330712, retrieved from Internet: URL:http://www.blu-raydisc.com/Section_13628/Index.html> [retrieved on Jun. 6, 2005].

Office Action for U.S. Appl. No. 11/325,341 dated Sep. 18, 2009.

Russian Notice of Allowance dated Sep. 24, 2009.

Office Action for U.S. Appl. No. 11/325,493 dated Nov. 23, 2009.

Search Report for European application No. 05819111 dated Nov. 20, 2009.

Search Report for European application No. 05786908 dated Nov. 30, 2009.

Blu-Ray Disc: "White Paper Blu-ray Disc Format. 2.B Audio Visual Application Format Specifications for BD-ROM" Internet Citation, [Online] XP007903517 Retrieved from the internet: URL:http://www.blu-raydisc.com/assets/downloadable_file/2b_bdrom_audiovisualapplication_0305-12955-13403.pdf> [retrieved on Nov. 16, 2007].

"Application Definition Blu-ray Disc Format BD-J Baseline Application and Logical Model Definition for BD-ROM" Internet Citation, [Online] Mar. 1, 2005, pp. 1-45, XP007904998, retrieved from the internet: URL:http://www.blurayjukebox.com/pdfs/bdj_gem_application_defintion_0503_07-13404> [retrieved on Jun. 18, 2008].

Office Action for U.S. Appl. No. 11/224,245 dated Dec. 11, 2009.

Office Action for U.S. Appl. No. 11/325,460, dated Feb. 17, 2010.

Notice of Allowance for Russian patent application No. 2007115808 dated Feb. 2, 2010 (in English translation).

Office Action for U.S. Appl. No. 11/325,493, dated Apr. 1, 2010.

* cited by examiner

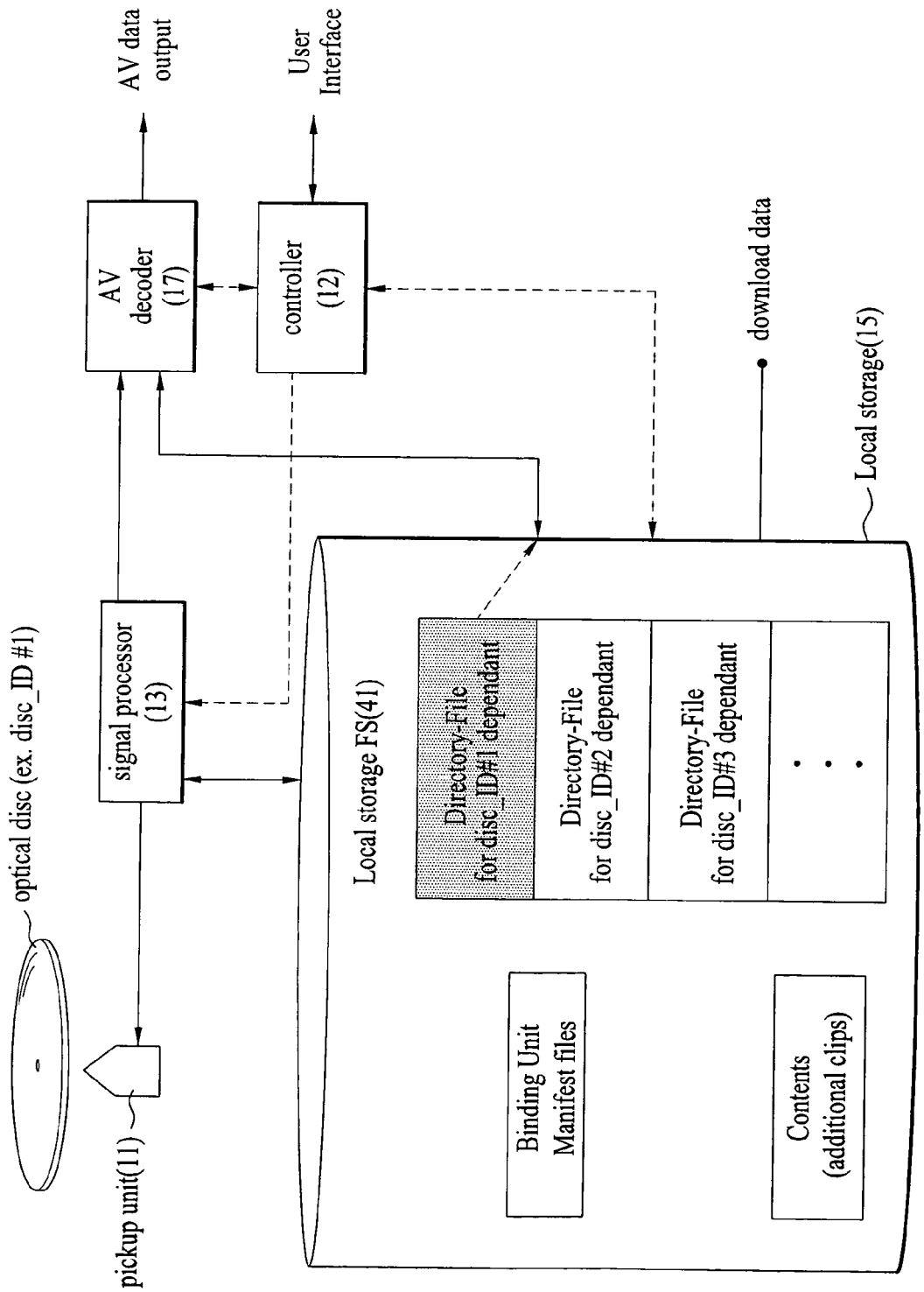

__METHOD AND APPARATUS FOR REPRODUCING DATA FROM RECORDING MEDIUM USING LOCAL STORAGE__

This application claims the benefit of U.S. Provisional Application No. 60/625,723, filed on Nov. 8, 2004, in the name of inventors Kang Soo SEO, Jea Yong Yoo, and Byung Jin KIM, entitled "PLAYBACK CONTROL OF THE BLU-RAY DISC IN CONNECTION WITH LOCAL STORAGE AND NETWORK", and U.S. Provisional Application No. 60/632,645, filed on Dec. 3, 2004, in the name of inventors Kang Soo SEO, Jea Yong Yoo, and Byung Jin KIM, entitled "METHOD OF MANAGING LOCAL STORAGE FOR HIGH DENSITY OPTICAL DISC", and U.S. Provisional Application No. 60/641,780, filed on Jan. 7, 2005, in the name of inventors Kang Soo SEO, Jea Yong Yoo, and Byung Jin KIM, entitled "LOCAL STORAGE FOR HIGH DENSITY OPTICAL DISC", which are hereby incorporated by reference as if fully set forth herein.

This application claims the benefit of Korean Patent Application No. 10-2005-0042546, filed on May 20, 2005, and 10-2005-0049467, filed on Jun. 9, 2005 which are hereby incorporated by reference as if fully set forth herein.

BACKGROUND OF THE INVENTION

1. Field of the Invention

The present invention relates to a method and apparatus for reproducing data from a recording medium, and more particularly to a method and apparatus for reproducing data from a recording medium using a local storage contained in an optical recording/reproducing device.

2. Discussion of the Related Art

Generally, there has been widely used an optical disc acting as a recording medium capable of recording a large amount of data therein. Particularly, there has recently been developed a high-density optical recording medium capable of recording/storing high-quality video data and high-quality audio data for a long period of time, for example, a Blu-ray Disc (BD).

The BD based on the next-generation recording medium technique has been considered to be the next-generation optical recording solution capable of storing much more data than a conventional DVD. In recent times, many developers have conducted intensive research into the international standard technical specification associated with the BD along with those of other digital devices.

In association with the above-mentioned situation, there has recently been developed an optical recording/reproducing device based on the BD international standard, but the BD international standard has not yet been completed, such that many limitations and problems occur in developing the optical recording/reproducing device.

Particularly, the above-mentioned optical recording/reproducing device must consider not only a basic function for recording/reproducing data of the BD, but also an additional function for enabling the optical recording/reproducing device to interact with peripheral digital devices. In other words, the optical recording/reproducing device must receive an external input signal, must display the received signal, and must reproduce desired data using the external input signal and the BD.

However, a method for reproducing data from the recording medium to simultaneously reproduce the external input signal and data of the BD has not yet been established, such that many limitations and problems occur in developing a BD-based optical recording/reproducing device.

SUMMARY OF THE INVENTION

Accordingly, the present invention is directed to a method and apparatus for reproducing data from a recording medium using a local storage that substantially obviate one or more problems due to limitations and disadvantages of the related art.

An object of the present invention is to provide a method and apparatus for reproducing not only data stored in a recording medium, but also data stored in a local storage after being downloaded from an external part.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method for reproducing data of a recording medium using a local storage comprising the steps of: a) storing downloaded data in the local storage; b) determining whether the downloaded data can be updated to a local storage file structure, and updating the downloaded data to the local storage file structure if it is determined that the downloaded data can be updated; c) forming a binding unit in the updated local storage file structure; and d) forming a virtual package by combining the formed binding unit with a file structure contained in the recording medium, and reproducing recording medium data and/or downloaded local storage data according to the formed virtual package.

In another aspect of the present invention, there is provided a method for updating data of a local storage comprising the steps of: a) downloading files from an external part, and storing the downloaded files in the local storage; b) if the files are downloaded in the local storage, determining the presence or absence of an update request; c) if the presence of the update request is determined, determining whether the downloaded files can be updated or not; and d) if it is determined that the downloaded files can be updated, updating a binding unit contained in the local storage.

In yet another aspect of the present invention, there is provided a method for forming a virtual package comprising the steps of: a) storing downloaded data associated with a loaded recording medium in a local storage; b) forming a new file structure in the local storage by updating the downloaded data to a previous file structure in the local storage; c) forming a binding unit from the new file structure; and d) forming a virtual package by binding the binding unit to a recording medium file structure.

In yet another aspect of the present invention, there is provided an apparatus for reproducing data of a recording medium using a local storage comprising: a pickup unit for reading data from the recording medium; a local storage for downloading data associated with the recording medium data, storing the downloaded data, and including a first area for storing update-finished data and a second area for storing newly-downloaded data; and a controller for updating the data downloaded in the second area to the first area, forming a binding unit using the updated data, forming a virtual package, and controlling an operation of reproducing data contained in the recording medium and/or data contained in the local storage using the virtual package.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 4B is a block diagram illustrating an apparatus for reproducing data from an optical disc from among overall components contained in the optical recording/reproducing device shown in FIG. 4A according to the present invention;

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

A method and apparatus for reproducing data from a recording medium using a local storage will hereinafter be described with reference to the annexed drawings.

Prior to describing the present invention, it should be noted that most terms disclosed in the present invention correspond to general terms well known in the art, but some terms have been selected by the applicant as necessary and will hereinafter be disclosed in the following description of the present invention. Therefore, it is preferable that the terms defined by the applicant be understood on the basis of their meanings in the present invention.

A recording medium for use in the present invention is indicative of all recordable mediums, for example, an optical disc, and a magnetic tape, etc., according to various recording schemes. It should be noted that the term "disc" of the present invention is equal to the recording medium.

For the convenience of description and better understanding of the present invention, the optical disc, such as a BD, will hereinafter be exemplarily used as the above-mentioned recording medium in the present invention. It should be noted that technical ideas of the present invention can be applied to other recording mediums without departing from the scope and spirit of the invention.

Figure 1:
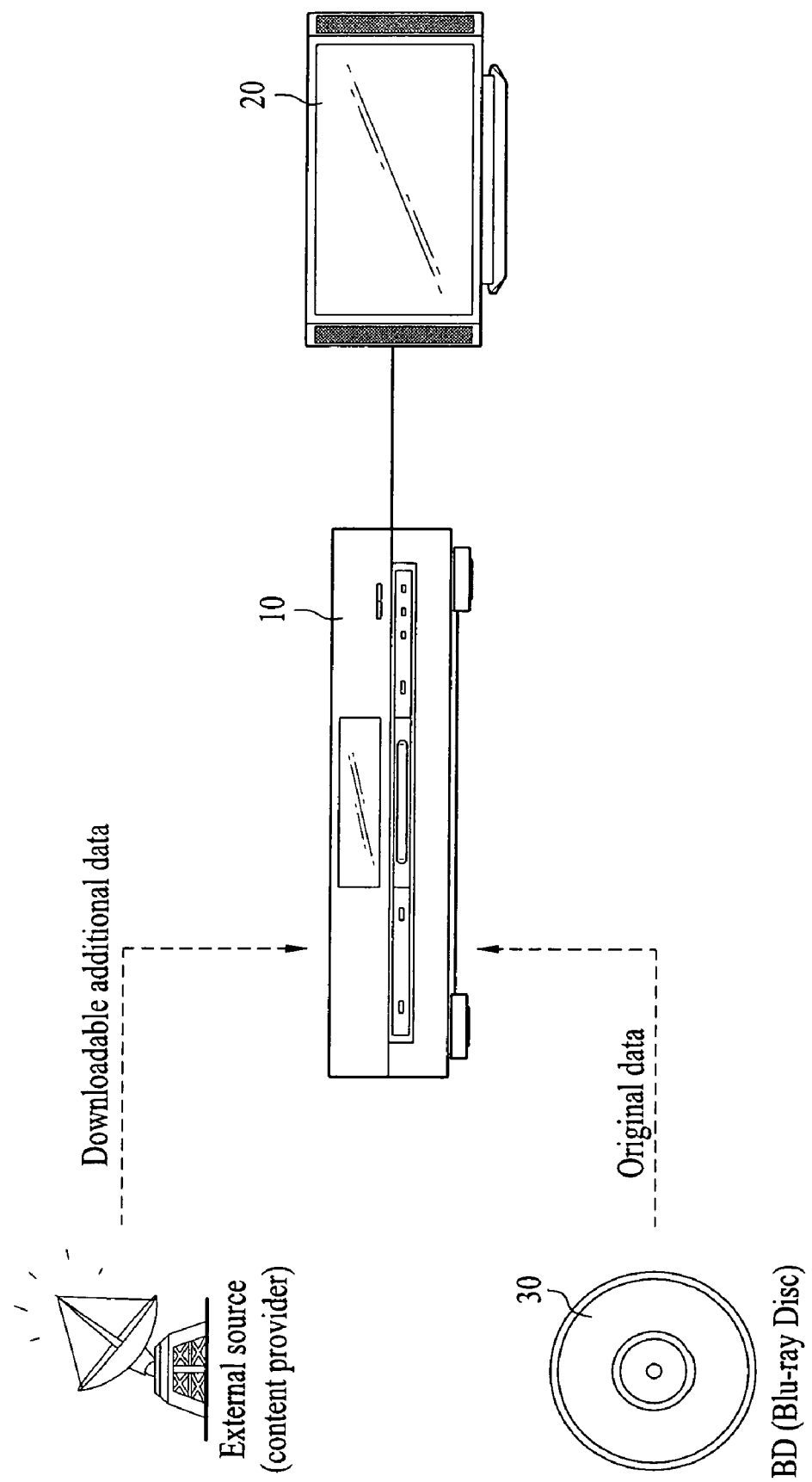
FIG. 1 is a conceptual diagram illustrating a method and apparatus for reproducing data from a recording medium according to the present invention.

The term "local storage" is indicative of a storage unit contained in an optical recording/reproducing device 10 shown in FIG. 1. In more detail, the term "local storage" is indicative of a component capable of receiving necessary information or data from a user, and storing the received information or data. For example, a general local storage may be indicative of a Hard Disc Drive (HDD), but it should be noted that the term "local storage" of the present invention is not limited to the HDD, and is applicable to other examples as necessary.

Particularly, the term "local storage" is indicative of a storage unit for storing data associated with a recording medium such as a BD. The data associated with the recording medium is generally downloaded from an external device.

In association with the above-mentioned description, it is obvious to those skilled in the art that the local storage may directly read some permission data from the recording medium, and may generate system data (e.g., metadata) associated with record/reproduction operations of the recording medium, such that the system data may be stored in the local storage.

The term "binding unit" is indicative of a set of files stored in the local storage. Particularly, the binding unit is indicative of a set of information (i.e., an information set) associated with a specific recording medium. In this case, the information set is replaced with or is added to file information contained in the specific recording medium, such that it can simultaneously reproduce data of the recording medium and data of the local storage. A detailed description of the binding unit will be given later.

For the convenience of description, data recorded in the recording medium is referred to as "original data", data associated with the recording medium from among a plurality of data units stored in the local storage is referred to as "additional data".

FIG. 1 is a conceptual diagram illustrating a method and apparatus for reproducing data according to the present invention. Unified usages of the optical recording/reproducing 10 and peripheral devices are shown in FIG. 1.

The optical recording/reproducing device 10 can record/reproduce data in/from various optical discs having different formats. If necessary, the optical recording/reproducing device 10 can record/reproduce specific data in/from only a specific optical disc such as a BD, or can reproduce the data from the optical disc without recording the data in the same. It should be noted that the present invention exemplarily uses a BD-player capable of reproducing data from the BD or a BD-recorder capable of recording data in the BD in consideration of correlation between the BD and peripheral devices for the convenience of description. It is well known in the art that the optical recording/reproduction device 10 is also applicable to a drive embedded in a specific device such as a computer.

The optical recording/reproducing device 10 records or reproduces data in/from the optical disc 30, receives an external input signal, performs a signal process on the received signal, and transmits the signal processed result to the external display 20, such that a user can view the signal processed result on the display 20. In this case, there is no limitation in a receivable external signal. For example, representative external input signals may be determined to be a DTV-associated signal and an Internet-associated signal, etc. Specifically, the Internet is indicative of a communication network to which a user easily gains access, such that the user can download specific Internet data using the optical recording/reproducing device 10, and can use the downloaded data.

In association with the above-mentioned description, an entity for providing content data used as an external source is generally referred to as a content provider (CP).

When original data is recorded in the optical disc 30 seated in the optical recording/reproducing device 10, and additional data associated with the original data is present in other storage locations (e.g., Internet), the present invention aims to reproduce the original data and the additional data at the same time.

For example, it is assumed that multiplexed AV (Audio/Video) streams are recorded as the original data recorded in the optical disc, and additional data for use in the Internet is an audio stream different from an audio stream (e.g., Korean) of the original data. In this case, some users may download a specific audio stream (e.g., English) acting as additional data from the Internet, may desire to reproduce the downloaded audio stream along with the AV stream acting as original data, or may desire to reproduce only the additional data. In order to implement the above-mentioned desires of the users, correlation between the original data and the additional data must be established, and there is needed a systemized method for managing/reproducing the above-mentioned data according to a user request.

For the convenience of description, although a signal recorded in the disc is referred to as original data, and other signals existing in the outside of the disc are referred to as additional data, it should be noted that the original data and the additional data are not limited to any specific data.

Generally, additional data may be indicative of audio data, presentation graphic (PG) data, interactive graphic (IG) data, or text subtitle, etc., but the additional data may also be indicative of a multiplexed AV stream including the above-mentioned data and video data. In other words, data associated with the original data simultaneously existing in the outside of the optical disc may act as additional data.

In order to satisfy the above-mentioned user requests, a predetermined file structure must be established between the original data and the additional data. Accordingly, a file structure and data record structure for use in the BD will hereinafter be described with reference to FIGS. 2-3.

Figure 2:
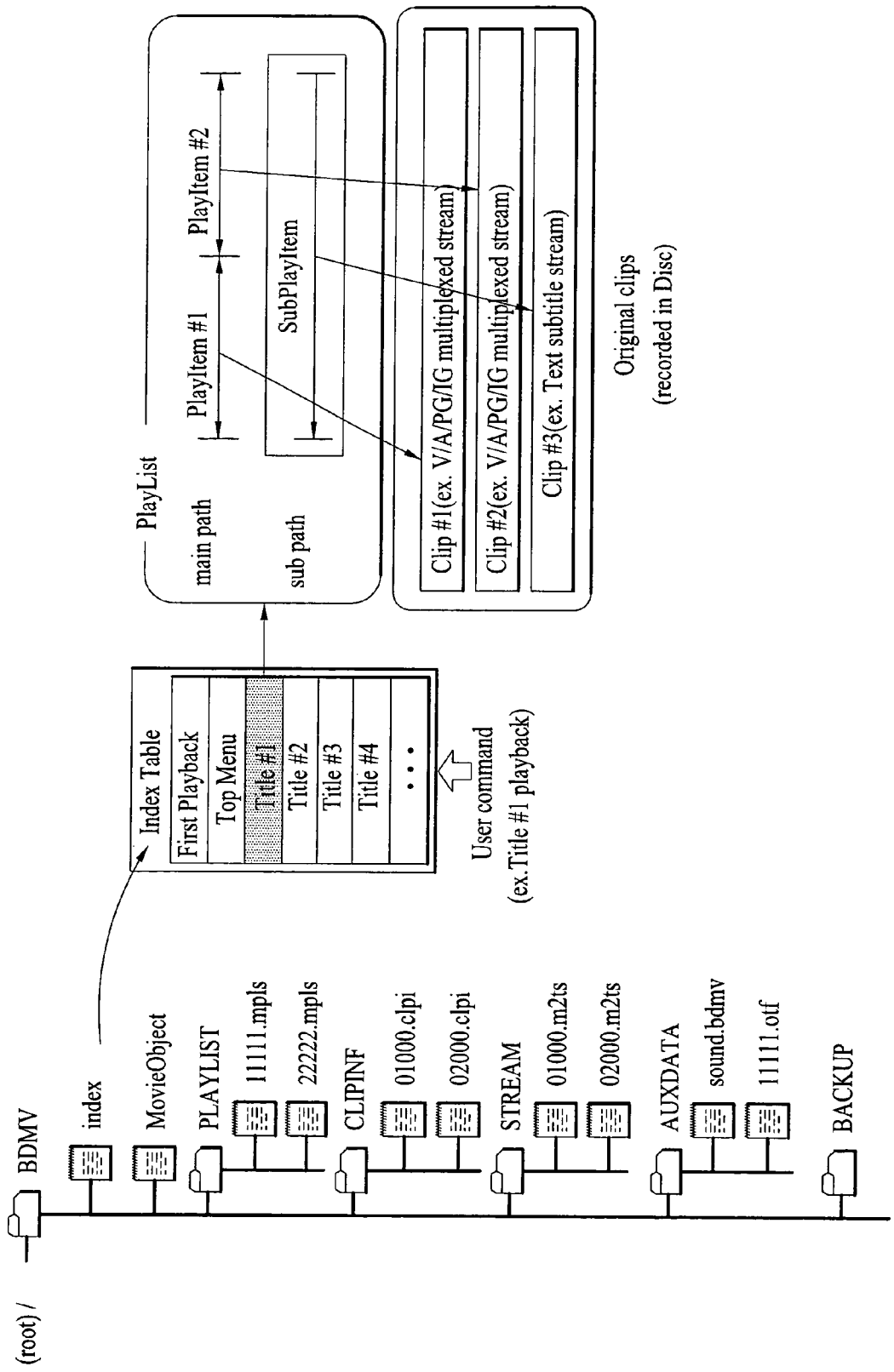
FIG. 2 is a conceptual diagram illustrating a file structure recorded in an optical disc acting as a recording medium and a method for reproducing a specific title using the file structure.

FIG. 2 is a conceptual diagram illustrating a file structure for reproducing/managing the original data recorded in an optical disc, and a method for reproducing a specific title according to the file structure.

An example of the above-mentioned file structure is shown in FIG. 2. The file structure according to the present invention includes one or more BD directories (BDMV) under a single root directory. The BD directory (BDMV) includes not only an index file "index" acting as a general file (i.e., an upper file) capable of guaranteeing user interactivity, but also the above-mentioned object. The file structure includes a variety of directories for storing information of actual data recorded in a disc and other information associated with a method for reproducing the data, for example, a playlist directory (PLAYLIST), a clip information directory (CLIPINF), a stream directory (STREAM), an auxiliary directory (AUXDATA), and a backup directory (BACKUP). The above-mentioned directories and a variety of files included in the directory will hereinafter be described.

The AUXDATA directory includes an additional data file for reproducing data of the disc. For example, the AUXDATA directory includes a "sound.bdmv" file for providing a user with sound data when an interactive graphic function is executed, and an "11111.otf" file for providing the user with font information when data of the disc is reproduced.

The stream directory (STREAM) includes a plurality of AV stream files recorded in a disc according to a specific format. Generally, individual streams are recorded using an MPEG-2 based transport packet, and the stream directory (STREAM) uses extension names of stream files (01000.m2ts and 02000.m2ts) as a specific extension name "*.m2ts". Particularly, if video/audio/graphic information from among the above-mentioned streams is multiplexed, the multiplexed information is called an AV stream, and a single title is composed of at least one AV stream file.

The clip information (Clip-info) directory (CLIPINF) is composed of a plurality of clip-info files (01000.clpi and 02000.clpi) connected to the above-mentioned stream files on a one-to-one basis. Particularly, the clip-info files (*.clpi) record attribute information and timing information of the stream files (*.m2ts) therein. The clip-info files (*.clpi) connected to the stream files (*.m2ts) on a one-to-one basis are generically referred to as a "Clip". In other words, this means that a single clip is indicative of data composed of a stream file (*.m2ts) and a clip-info file (*.clpi).

The playlist directory (PLAYLIST) includes a plurality of playlist files (*.mpls). Each playlist file (*.mpls) includes one or more playitems (PlayItem) and one or more sub-playitems (SubPlayItem). Each playitem (PlayItem) and each sub-playitem (SubPlayItem) are adapted to designate a playing interval during which a specific clip is reproduced. The playitem (PlayItem) and the sub-playitem (SubPlayItem) include information associated with a specific clip to be reproduced, i.e., information associated with a reproduction start time (IN-Time) and other information associated with a reproduction termination time (OUT-Time) of the specific clip.

In association with the above-mentioned description, a process for reproducing data using at least one playitem (PlayItem) in the playlist file is referred to as a main path, and a process for reproducing data using individual sub-play items (SubPlayItem) is referred to as a sub-path. The playlist file must contain the main path. The playlist file may contain at least one sub-path according to the presence or absence of the sub-playitem (SubPlayItem) as necessary.

In conclusion, the playlist file acts as a basic reproduction/management file unit contained in overall reproduction/management file structures for reproducing a desired clip by combination of one or more playitems (PlayItem).

The backup directory (BACKUP) stores a plurality of duplicate files, i.e., a duplicate file (also called "copied files") of the index file "index" storing information associated with disc reproduction, a duplicate file of the object file "MovieObject", duplicate files of all playlist files (*.mpls) contained in the playlist directory (PLAYLIST), and duplicate files of all clip-info files (*.clpi) contained in the clip-info directory (CLIPINF). If the above-mentioned files ("index", "MovieObject", "*.mpls", and "*.clpi") are damaged, a disc reproduction process is also fatally damaged, such that the backup directory (BACKUP) is designed to pre-store duplicate files of the above-mentioned files as backup files.

In association with the above-mentioned description, a method for reproducing a specific title using the above-mentioned disc file structure is shown in FIG. 2.

If a user enters a title reproduction command in association with a title used as an index file (also called "index table"), reproduction of the title begins. A detailed description thereof will hereinafter be described.

The index file (index.bdmv) includes first playback information "First Playback" indicative of information associated with a first reproduction image when data of a corresponding disc is loaded, top menu information "Top Menu" for providing a menu image, and at least one title information "Title #1-Title #n".

If the disc 30 is loaded in the optical recording/reproducing device 10, title menu information associated with the index table is provided to the user via the display 20. If the user selects a specific title or a specific menu contained in a menu image, data reproduction begins according to a scenario pre-defined by a disc manufacturer. In other words, if the user enters a command for reproducing a specific title (e.g., title #1), a specific playlist file is executed according to a command contained in the object file (MovieObject) of the reproduction/management file structure. Thereafter, one or more clips (e.g., Clip #1☐Clip #3) constructing the title #1 are reproduced by a specific playitem and/or sub-playitem contained in the playlist file according to the playlist file information.

Figure 3:
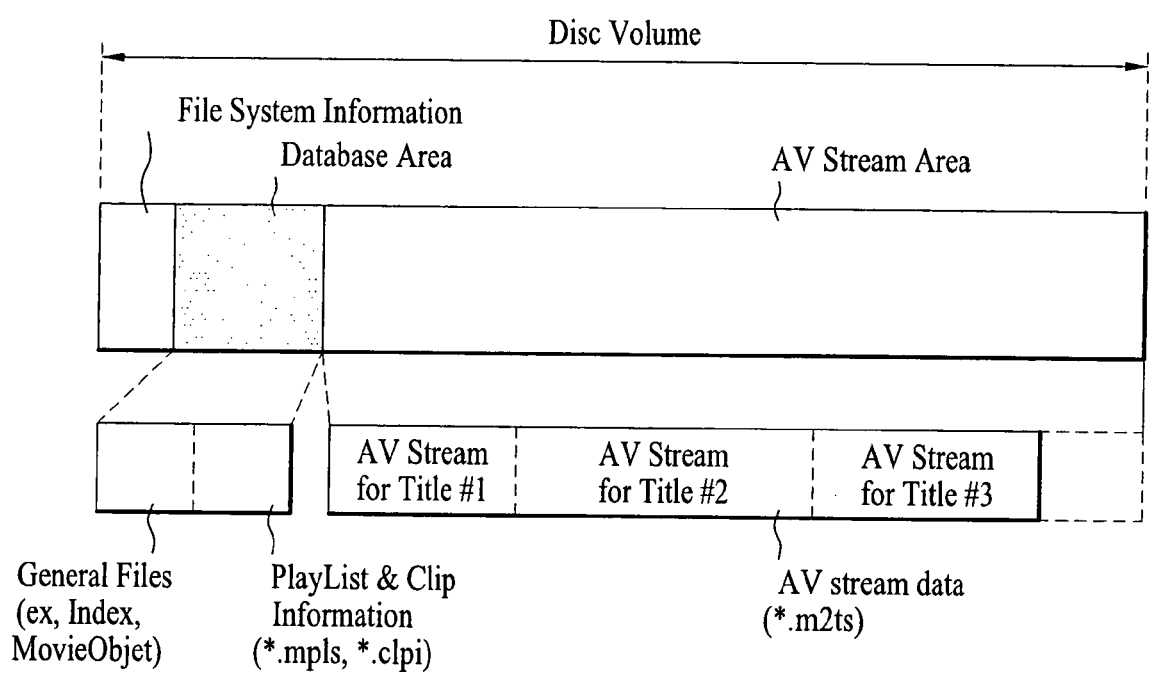
FIG. 3 is a structural diagram illustrating a data record structure of an optical disc acting as a recording medium according to the present invention.

FIG. 3 is a structural diagram illustrating a data record structure recorded in a recording medium according to the present invention. In more detail, FIG. 3 shows a disc record format of information associated with the file structure. As shown in FIG. 3, from the viewpoint of an inner area of the disc, the above-mentioned disc structure sequentially includes a file system information area serving as system information for managing overall files, a database area for recording a playlist file and a clip-info file to reproduce a recorded AV stream (*.m2ts), and an AV stream area for recording a plurality of streams composed of audio data, video data, and graphic data, etc. Particularly, it should be noted that data recorded in the AV stream area may be determined to be original data as previously stated above.

The present invention provides a method and apparatus for simultaneously reproducing original data (e.g., a file structure shown in FIG. 2) recorded in the disc and additional data recorded in the local storage, and a variety of preferred embodiments according to the present invention will hereinafter be described.

Figure 4A:
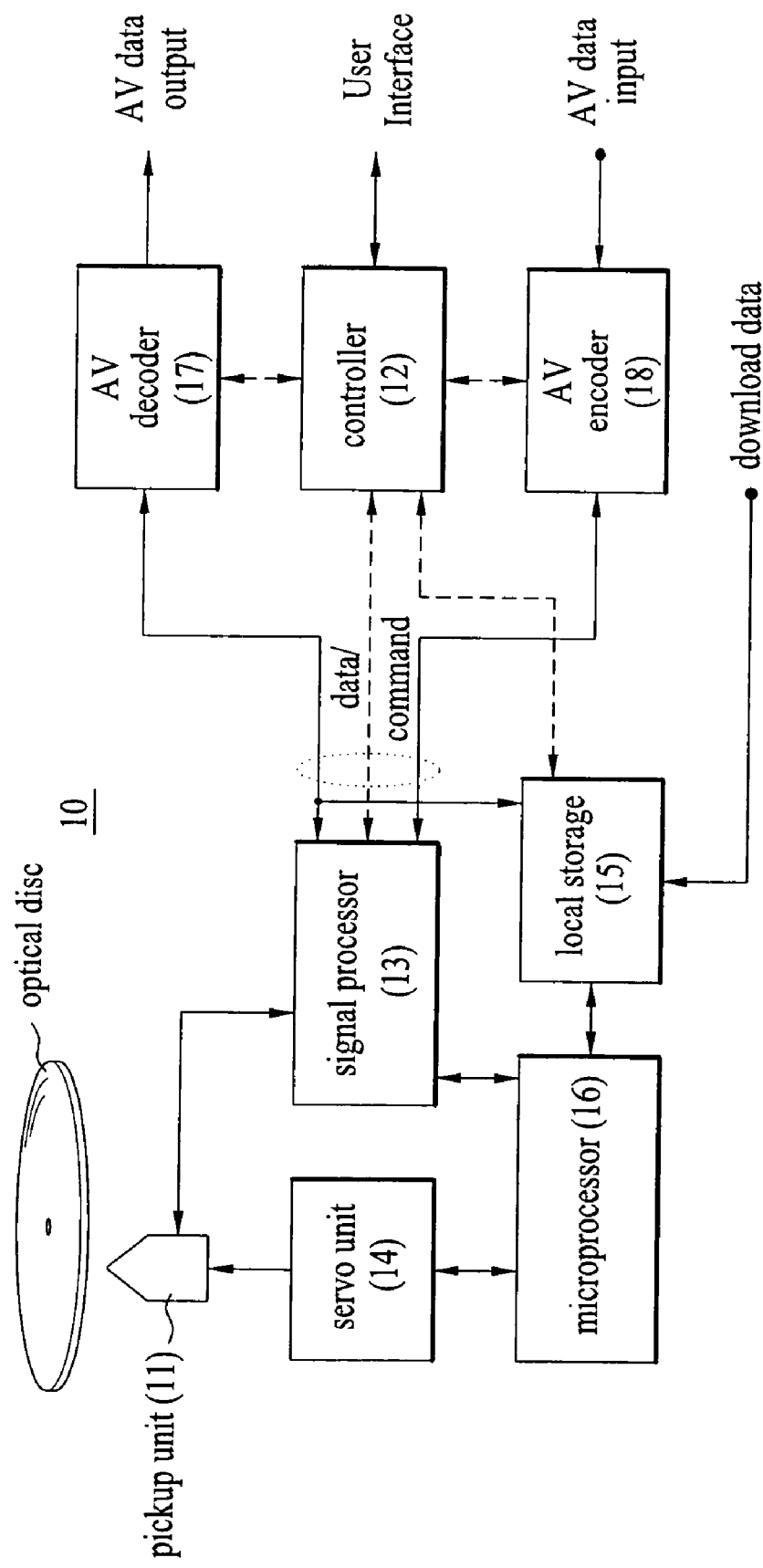
FIG. 4A is a block diagram illustrating an optical recording/reproducing device according to the present invention.

FIG. 4A is a block diagram illustrating the optical recording/reproducing device 10 according to the present invention.

Referring to FIG. 4A, the optical recording/reproducing device 10 includes a pickup unit 11, a servo unit 14, a signal processor 13, a local storage 15, and a microprocessor 16. The pickup unit 11 reads original data recorded in the optical disc and management information including reproduction/management file information. The servo unit 14 controls operations of the pickup unit 11. The signal processor 13 receives a reproduction signal from the pickup unit 11, restores the received reproduction signal to a desired signal value, or modulates a signal to be recorded into another signal recorded in the optical disc, such that it transmits the restored or modulated result. The local storage 15 stores data therein. The microprocessor 16 controls mutual operations of the above-mentioned components.

Preferably, if a file structure for storing data downloaded from an external part is constructed, the local storage 15 may include a temporary area for temporarily storing the downloaded data.

For example, if data downloaded from an external content provider (CP) is stored in a local storage file structure, data is firstly downloaded in the temporary area, and the downloaded data is stored in the temporary area. Thereafter, upon receipt of an update command, the data contained in the temporary area is updated to the local storage file structure, and a binding unit is formed on the basis of the updated file structure.

On the contrary, if data downloaded from the external content provider (CP) is not stored in the local storage file structure, it is preferable that the temporary area need not store the aforementioned downloaded data temporarily, and is directly stored in the local storage file structure.

A controller 12 downloads additional data from outside of the optical disc upon receiving a command from a user, stores the downloaded additional data in the local storage 15, and configures a binding unit using Binding Unit Manifest Information recorded in Binding unit manifest file of the local storage. In addition, the controller 12 configures a virtual file structure (hereinafter referred to as a virtual package) using the binding unit manifest information recorded in the binding unit manifest file, such that it can reproduce data contained in the recording medium and data contained in the local storage. The controller reproduces the original data and/or the additional data using the virtual package upon receiving a request from a user.

A decoder 17 finally decodes output data (i.e., original data and/or additional data) upon receiving a control signal from the controller 12, and provides the user with the decoded result.

An encoder 18 converts an input signal into a specific format signal (e.g., an MPEG2 transport stream) upon receiving a control signal from the controller 12, and transmits the converted result to the signal processor 13.

The new virtual package may be stored in the local storage 15 such that it can be re-used in the future. Also, the new virtual package may be temporarily stored in an additional dynamic memory, and may then be used.

FIG. 4B is a block diagram illustrating an apparatus for reproducing data of an optical disc using a local storage from among overall components contained in the optical recording/reproducing device 10 according to the present invention.

Information stored in the local storage 15 will hereinafter be described. The local storage 15 according to the present invention stores file information (Directory-File for Disc_id #n dependent) including directories and files of individual disc identification (ID) information, and a plurality of additional clips downloaded from an external part. A binding unit of the local storage 15 is formed, and the local storage 15 may store binding unit manifest information for a binding operation associated with a disc file structure (i.e., a disc package).

Specifically, the local storage 15 may include a plurality of file information units (Directory-File for Disc_id #n dependent) to cope with different discs. Therefore, the local storage 15 additionally requires a file system for managing the above-mentioned file information units. Specifically, the file system is also referred to as a local storage file system 41, and the local storage file system 41 is indicative of a system for managing all files stored in the local storage 15.

Therefore, if an optical disc (e.g., disc_ID #1) of a specific disc ID (disc_ID) is loaded in the optical recording/reproducing device 10, the controller 12 contained in the optical recording/reproducing device 10 recognizes ID information of the disc using the pickup unit 11 and the signal processor 13. If the local storage 15 stores file information, the controller reads binding unit file information equal to the loaded disc ID information from among all file information units stored in the local storage 15, forms a virtual package by binding (or combining) the read information and the disc package, and reproduces both the original data of the disc and the additional data of the local storage using the formed virtual package.

In association with the above-mentioned description, if new additional data must be downloaded from an external content provider (CP), and must be stored in the local storage on the condition that the binding unit is present in the local storage file structure, the present invention does not directly update the above-mentioned downloaded additional data to the local storage file structure, and temporarily stores the above-mentioned downloaded additional data in a temporary area contained in the local storage, such that the above-mentioned downloaded additional data is updated to the local storage file structure upon receipt of an update request.

Therefore, the binding unit is formed in the updated local storage, information of the local storage file structure is updated, and then the temporary area of the local storage becomes empty.

However, if the data pre-downloaded from the external content provider (CP) is not stored in the local storage file structure, i.e., if no file information is contained in the local storage 15, the data downloaded from the content provider (CP) acting as an external input source is not downloaded in a temporary area of the local storage, and is directly downloaded in the local storage file structure, such that a binding unit is formed. And, the controller 12 reads the binding unit file information, and forms a virtual package by binding (or combining) the read information and the disc package.

A preferred embodiment for forming the virtual package by updating the local storage file information according to the present invention will hereinafter be described.

Figure 5:
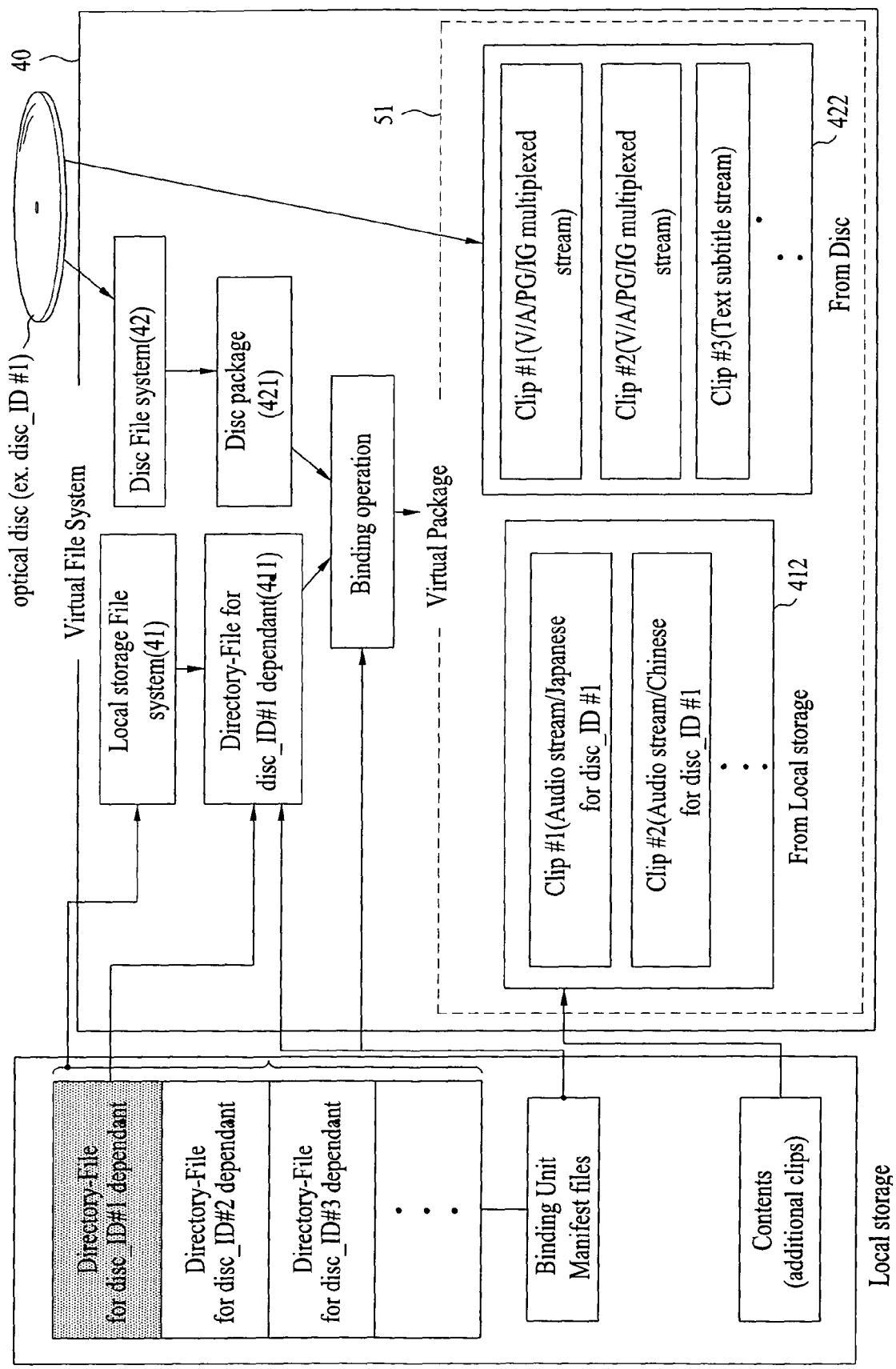
FIG. 5 is a conceptual diagram illustrating a method for forming a virtual package according to the present invention.

FIG. 5 is a conceptual diagram illustrating a method for forming a virtual package according to the present invention.

If a specific disc is loaded in the optical recording/reproducing device 10 on the condition that the information and content shown in FIG. 4B are stored in the local storage 15, the optical recording/reproducing device 10 reads the file system information 41 contained in the local storage 15, and at the same time reads disc file system information 42 including the file structure recorded in the disc, resulting in the creation of the VFS. In more detail, the virtual file system (VFS) is indicative of a file system virtually formed to manage both the file system contained in the local storage 15 and the other file system of the loaded disc.

The optical recording/reproducing device forms a new virtual package to simultaneously reproduce original data recorded in the disc and additional data recorded in the local storage using the above-mentioned virtual file system (VFS). For this purpose, the optical recording/reproducing device 10 reads file information (Directory-File for disc_ID #1 dependent) associated with the disc (e.g., disc_ID #1) from the file system, forms a binding unit according the read binding unit manifest information, reads the forms binding unit, and performs a binding operation for replacing the read file information with a disc package of the loaded disc (disc_ID #1) or adding the read file information to the disc package.

In association with the above-mentioned description, the binding unit manifest file according to the present invention includes a list (i.e., Files and Titles relation List) indicative of a relationship between files and titles; Name Mapping information for performing mapping of all files contained in the binding unit to form the virtual package; Progressive Playlist information for progressive playlists; and Credential information.

Specifically, the above-mentioned name mapping information is used when file structure data of the local storage forms the binding unit or when the binding unit is combined with the disc package.

The virtual package formed by the above-mentioned binding operation is indicative of a file structure for reproducing/managing an original clip 422 and an additional clip 412. The original clip 422 is composed of original data recorded in the disc. The additional clip 412 is composed of additional data recorded in the local storage.

Figure 6:
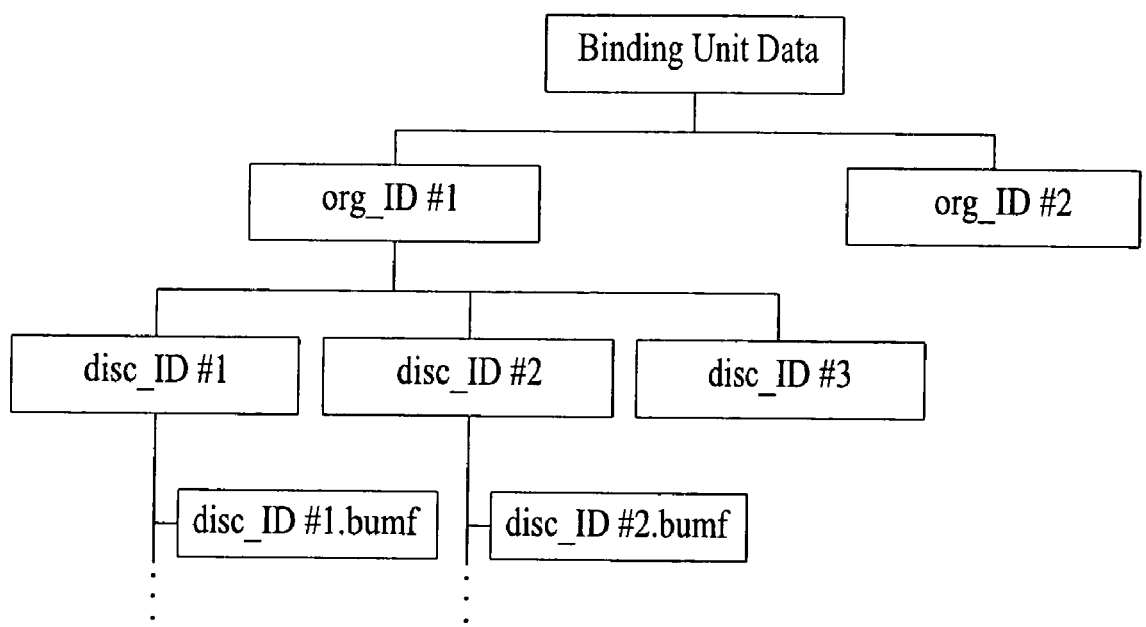
FIG. 6 is a structural diagram illustrating a file structure contained in a local storage including downloaded additional data according to the present invention.

FIG. 6 is a structural diagram illustrating a file structure contained in a local storage including downloaded additional data according to the present invention. Specifically, FIG. 6 shows locations of the binding unit manifest file.

A binding unit data directory is used as an upper directory. A plurality of organization directories (e.g., org_ID #1, and org_ID #2) of individual content providers (CPs) are contained in a lower directory. In this case, the number of organization directories is equal to the number of CPs.

Unique disc directories (e.g., disc_ID #1, and disc_ID #2) of individual recording mediums are contained in a lower directory of the above-mentioned organization directory (e.g., org_ID #1). Also, the lower directory of the organization directory (e.g., org_ID #1) further includes a shared directory commonly applied to the above-mentioned all disc directories (e.g., disc_ID #1, and disc_ID #2).

In association with the above-mentioned description, the binding unit manifest file (disc_ID #1.bumf) may be contained in the above-mentioned disc directory (disc_ID #1). However, it should be noted that the binding unit manifest file (disc_ID #1.bumf) is not directly arranged under the disc directory (disc_ID #1), an additional lower directory is formed, and the binding unit manifest file (disc_ID #1.bumf) may be contained in the above-mentioned additional lower directory. For example, a META directory (not shown) may be contained as a lower directory in the disc directory (disc_ID #1), and the binding unit manifest file (disc_ID #1.bumf) may also be contained in the META directory.

In association with the above-mentioned description, the above-mentioned binding unit manifest file (disc_ID #1.bumf) may include mapping information, which performs mapping of not only all files arranged under the disc directory (disc_ID #1) for a specific recording medium, but also files associated with the specific recording medium from among files contained in the shared directory.

Figure 7A:
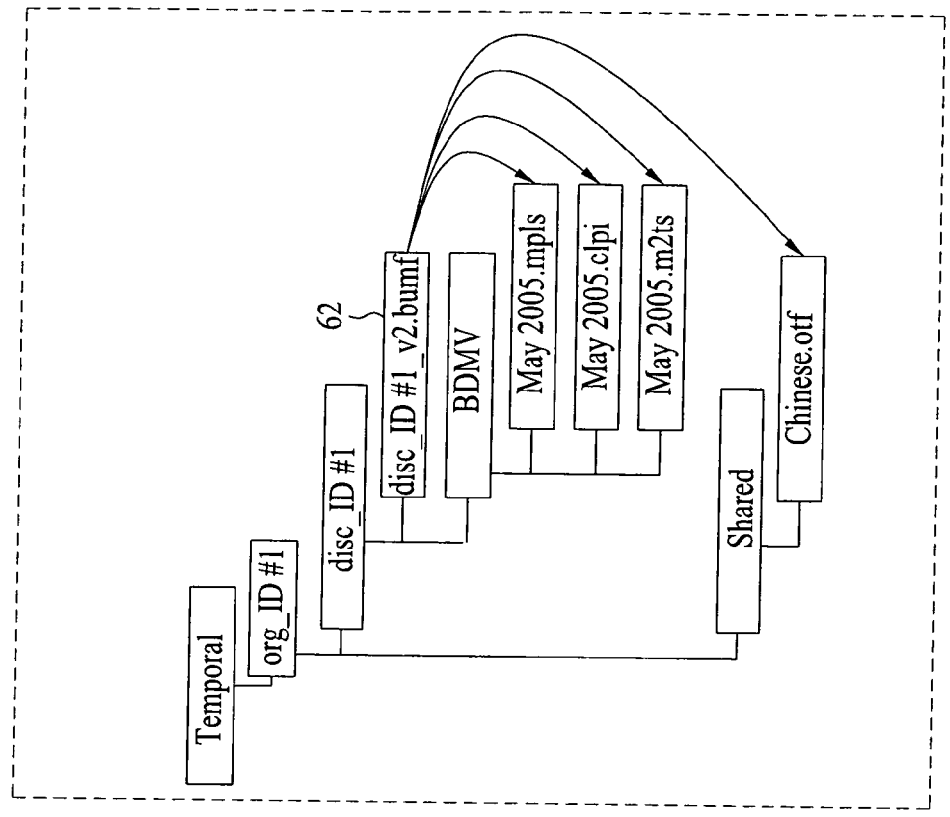
FIG. 7A is a structural diagram illustrating a local storage file structure, and a temporary area for temporarily downloading data from a content provider and storing the downloaded data according to the present invention.
Figure 7A:
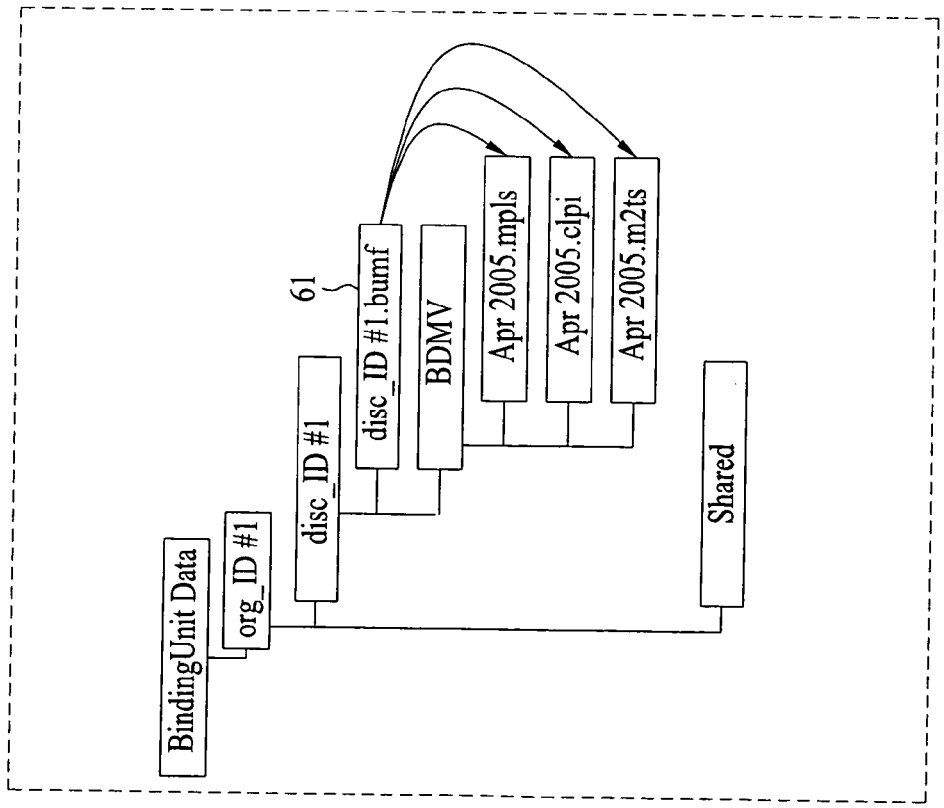

FIG. 7A is a structural diagram illustrating a local storage file structure, and a temporary area for temporarily downloading data from a content provider and storing the downloaded data according to the present invention. Specifically, FIG. 7A shows a situation provided before data of the local storage file structure is updated.

For example, the present invention can divide the local storage into two areas, i.e., a local storage file structure, and a temporary area. In this case, a plurality of data pieces downloaded from an external content provider (CP) are configured in the form of a file structure, and is then stored in the local storage file structure. New data different from old data is downloaded from the external content provider (CP), and is then temporarily stored in the temporary area.

In association with the above-mentioned description, the above-mentioned local storage file structure includes a binding unit data (BindingUnitData) directory. The organization directory (e.g., org_ID #1) indicative of a content provider (CP) is contained in the BindingUnitData directory. The organization directory (org_ID #1) includes at least one disc directory (e.g., disc_ID #1) and a shared directory (e.g., Shared) commonly applied to all discs manufactured by the disc author.

The disc directory (disc_ID #1) includes a binding unit manifest file (disc_ID #1.bumf) 61 and a BD directory (BDMV). The BD directory (BDMV) includes a playlist file (e.g., Apr2005.mpls), a clip-info file (e.g., Apr2005.clpi), and a stream file (e.g., Apr2005.m2ts). The binding unit manifest file (disc_ID #1.bumf) 61 includes mapping information associated with specific files (e.g., Apr2005.mpls, Apr2005.clpi, and Apr2005.m2ts) contained in the BD directory (BDMV).

Also, a temporary area of the local storage includes the same directory file structure as the above-mentioned local storage file structure. For example, the local storage includes the temporary area, an organization directory (org_ID #1) is used as a lower directory, and the organization directory (org_ID #1) may include a disc directory (disc_ID #1) and a shared directory (Shared).

The disc directory (e.g., disc_ID #1) contained in the temporary area includes a binding unit manifest file (e.g., disc_ID #1_v2.bumf) 62 and a BD directory (BDMV). The BDMV directory (BDMV) includes a playlist file (e.g., May2005.mpls), a clip-info file (e.g., May2005.clpi), and a stream file (e.g., May2005.m2ts). The shared directory (Shared) contained in the temporary area includes an AUX-DATA (auxiliary data) file (e.g., Chinese.otf).

The binding unit manifest file (disc_ID #1_v2.bumf) 62 includes mapping information associated with specific files (e.g., May2005.mpls, May2005.clpi, and May2005.m2ts) contained in the BD directory (BDMV), and mapping information associated with a specific file (e.g., Chinese.otf) contained in the shared directory (Shared). As can be seen from FIG. 7A, it can be recognized that downloaded data is temporarily stored without being updated to the local storage file structure.

Figure 7B:
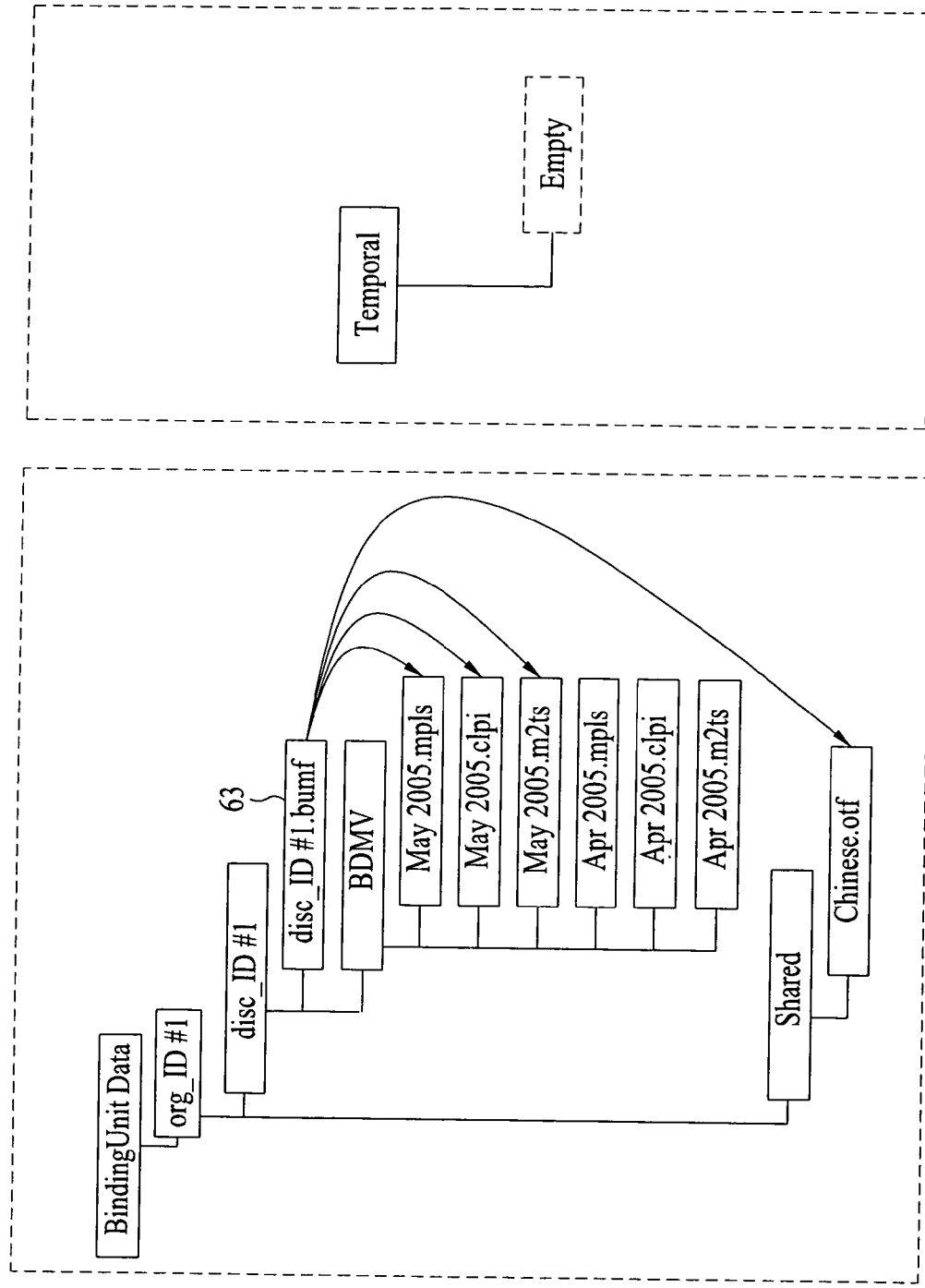
FIG. 7B shows a structure formed when data of the temporary area for temporarily downloading new data from the content provider is updated to a local storage file structure according to the present invention.

FIG. 7B shows a structure formed when data of the temporary area for temporarily downloading new data from the content provider is updated to a local storage file structure according to the present invention.

In this case, it is preferable that the update of the local storage file structure is executed upon receiving a request from a virtual file system (VFS). Although there is a request from the virtual file system (VFS), provided that verification errors associated with newly-downloaded data occur, or data is currently reproduced by the optical recording/reproducing device, the local storage file structure is not updated.

Referring to FIG. 7B, if the local storage file structure is updated as described above, it can be recognized that the local storage file structure integrates a temporarily-stored data file into an old file structure formed before the local storage file structure is updated. However, it should be noted that the binding unit manifest file formed after performing the above-mentioned update operation is a substitute for a binding unit manifest file (disc_ID #1_v2.bumf) 62 contained in the temporary area of FIG. 7A. Therefore, data pieces newly-downloaded by the above-mentioned binding unit manifest file (disc_ID #1.bumf) 63 are contained in the binding unit, and a detailed description thereof will hereinafter be described with reference to FIG. 8.

Figure 8:
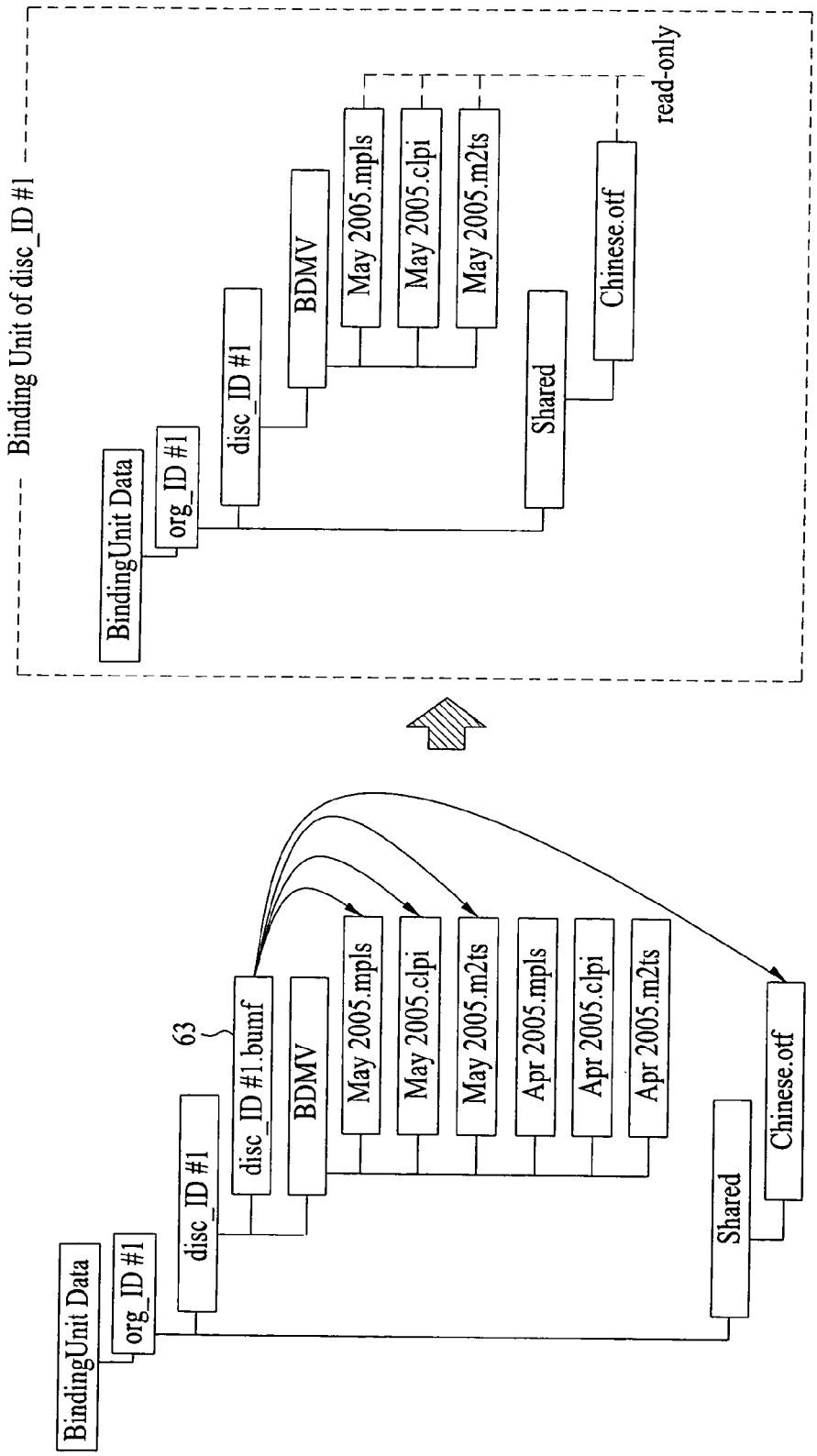
FIG. 8 is a structural diagram illustrating a binding unit of a local storage for forming a virtual package according to the present invention.

FIG. 8 is a structural diagram illustrating a binding unit of a local storage for forming a virtual package according to the present invention.

Referring to FIG. 8, the binding unit manifest file (disc_ID #1.bumf) 63 contained in the updated local storage file structure includes mapping information indicative of the "May2005.mpls" file, the "May2005.clpi" file, and the "May2005.m2ts" file from among files contained in the BD directory (BDMV), and the "Chinese.otf" file acting as AUX-DATA file of the shared directory (Shared).

Therefore, the binding unit of a specific disc (e.g., disc_ID #1) is formed according to mapping information contained in the above-mentioned binding unit manifest file (disc_ID #1.bumf) 63. For example, the binding unit includes a playlist file "May2005.mpls", a clip-info file "May2005.clpi", a stream file "May2005.m2ts", and an AUXDATA file "Chinese.otf".

In association with the above-mentioned description, all files of the formed binding unit act as Read-Only files. The binding unit is combined with a recording medium file structure to form a new virtual package, such that data of the recording medium and data of the local storage are simultaneously reproduced, and a detailed description thereof will hereinafter be described with reference to FIG. 9.

Figure 9:
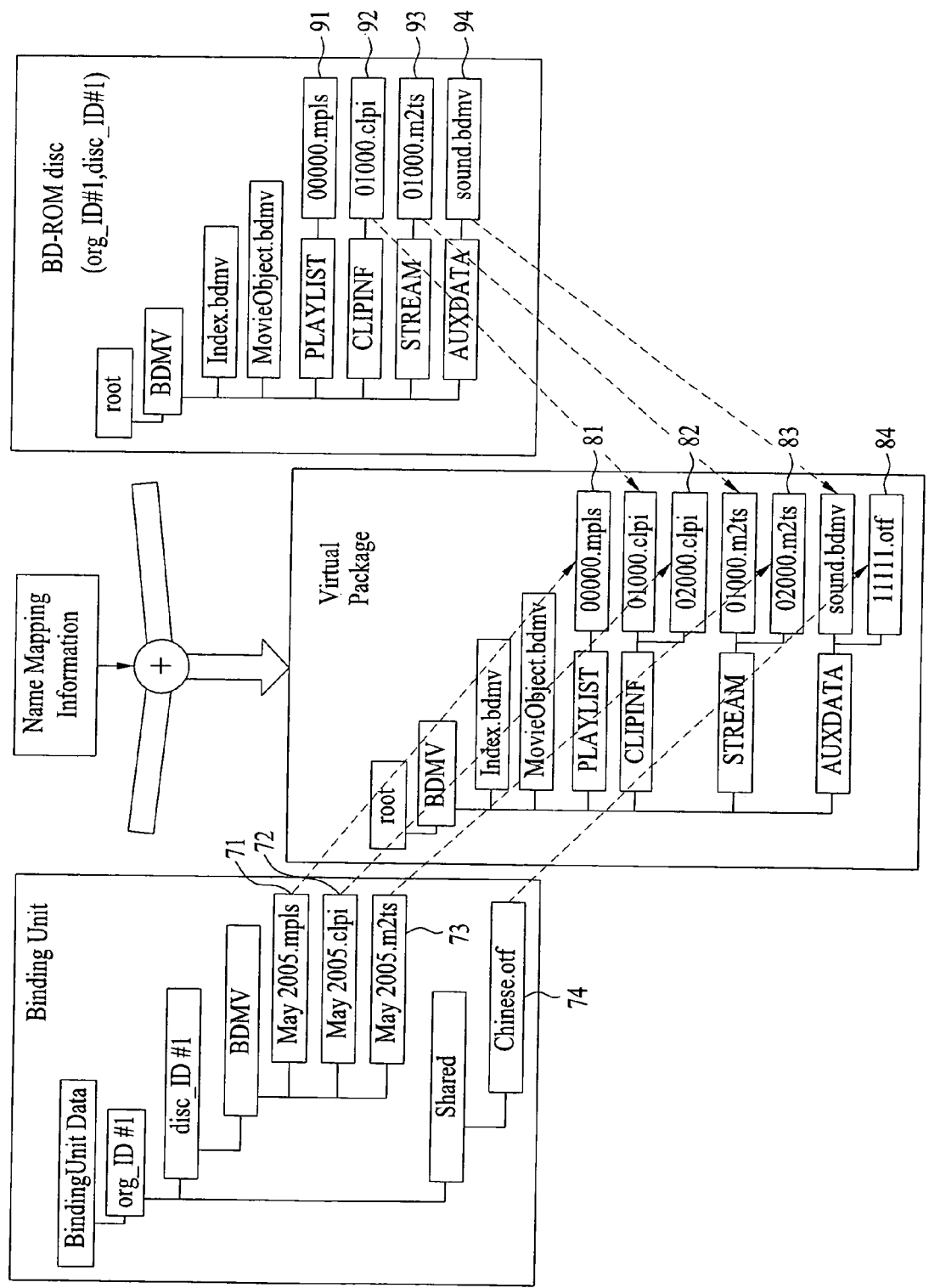
FIG. 9 is a conceptual diagram illustrating a method for forming a virtual package using a virtual file system (VFS) according to the present invention.

FIG. 9 is a conceptual diagram illustrating a method for forming a virtual package using a virtual file system (VFS) according to the present invention.

Referring to FIG. 9, a specific file structure (e.g., the structure of FIG. 2) is recorded in the loaded disc, and is also referred to as a disc package. The local storage includes a local storage file system 41. The file system 41 includes a binding unit combined with the loaded disc (e.g., disc_ID #1), and binding unit manifest file files.

In association with the above-mentioned description, although the binding unit is basically similar to the disc file structure, the binding unit cannot be operated as a reproduction/management file by itself, differently from the disc package. In more detail, if it is assumed that the binding unit is designed to perform data reproduction by itself, this data reproduction is similar to data reproduction of the local storage, such that the above-mentioned operations of the binding unit are contrary to the purpose of the present invention for simultaneously reproducing both original data recorded in the disc and additional data recorded in the local storage.

Therefore, the virtual file system (VFS) specifically uses name mapping information from among the above-mentioned binding unit manifest file, and performs a biding operation by binding (or combining) the newly-updated binding unit with the disc package contained in the loaded disc, such that it forms a new virtual package.

For example, it is assumed that the recording medium file structure (org_ID #1, disc_ID #1) contained in the disc includes an index file (Index.bdmv), an object file (MovieObject.bdmv), a playlist file (00000.mpls), a clip-info file (01000.clpi), a stream file (01000.m2ts), and an auxiliary data file (sound.bdmv) in the BD directory (BDMV) indicative of a lower directory of the root directory.

It is assumed that the newly-downloaded-updated binding unit associated with the loaded disc (e.g., disc_ID #1) includes a specific playlist file (May2005.mpls) 71, a clip-info file (May2005.clpi) 72 indicative of a clip managed by the playlist file (May2005.mpls) 71, and a stream file (May2005.m2ts) 73 in the BD directory (BDMV), and further includes an AUXDATA file (Chinese.otf) 74 in the disc shared directory (Shared).

The name mapping information of the binding unit manifest file according to the present invention includes specific information indicative of names and locations of the binding unit files in the virtual package. For example, according to the name mapping information of the binding unit manifest file, the playlist file (May2005.mpls) 71 contained in the binding unit is set to the playlist file (00000.mpls) 81 contained in the playlist directory (PLAYLIST) of the virtual package, the clip-info file (May2005.clpi) 72 is set to the clip-info file (02000.clpi) 82 of the clip-info directory (CLIPINF) of the virtual package, the stream file (May2005.m2ts) 73 is set to the stream file (02000.m2ts) 83 of the stream directory (STREAM) of the virtual package, and the AUXDATA file (Chinese.otf) 74 is set to the AUXDATA file (11111.otf) 84 of the AUXDATA directory of the virtual package.

Therefore, if the virtual package is formed by performing the binding operation according to the above-mentioned name mapping information, the following files are present in the formed virtual package.

Firstly, according to the above-mentioned name mapping information of the binding unit manifest file, the playlist file (00000.mpls) 81, the clip-info file (02000.clpi) 82, the stream file (02000.m2ts) 83, and the AUXDATA file (11111.otf) 84 are contained in the virtual package.

All files contained in the loaded disc are contained in the virtual package. For example, the playlist file, the clip-info file, the stream file, and the AUXDATA file contained in the disc are also present in the virtual package.

However, provided that a file having the same name as that of a specific file contained in the disc is present in the virtual package according to the above-mentioned name mapping information, only a file designated by the above-mentioned name mapping information is contained in the virtual package. For example, as can be seen from FIG. 9, it can be recognized that the playlist file (May2005.mpls) 71 contained in the binding unit is determined to be the playlist file (00000.mpls) 81 of the virtual package according to the name mapping information. Therefore, the disc's playlist file (00000.mpls) 91 having the same name as that of the above-mentioned playlist file (00000.mpls) 81 is not contained in the virtual package.

In other words, the above-mentioned situation means that the playlist file (May2005.mpls) 71 contained in the binding unit substitutes for the playlist file (00000.mpls) 91 of the disc. Therefore, the newly-downloaded data can be reproduced by the playlist file (00000.mpls) 81 contained in the virtual package.

On the contrary, the remaining files contained in the disc, for example, the clip-info file (01000.clpi) 92, the stream file (01000.m2ts) 93, and the AUXDATA file (sound.bdmv) 94, are contained in the virtual package.

In association with the above-mentioned description, the index file (Index.bdmv) and the object file (MovieObject.bdmv) contained in the virtual package can be updated from the disc index file (Index.bdmv) and the disc object file (MovieObject.bdmv). In more detail, the above-mentioned situation means that a title index of the virtual package is equal to a title index of the disc.

The index file (Index.bdmv) and the object file (MovieObject.bdmv) in the virtual package may also be replaced with the index file and the object file contained in the binding unit as necessary (not shown in FIG. 9). In more detail, the above-mentioned situation means that the title index of the virtual package is different from that of the disc. For example, if the addition of a new title in the virtual package, the deletion of a conventional title, or the change of a title reproduction scenario occurs by the newly-downloaded data, the above-mentioned situation means that the title index of the virtual package is different from that of the disc.

According to the aforementioned virtual package, original data indicative of recording medium data and additional data indicative of local storage data can be simultaneously reproduced.

Figure 10:
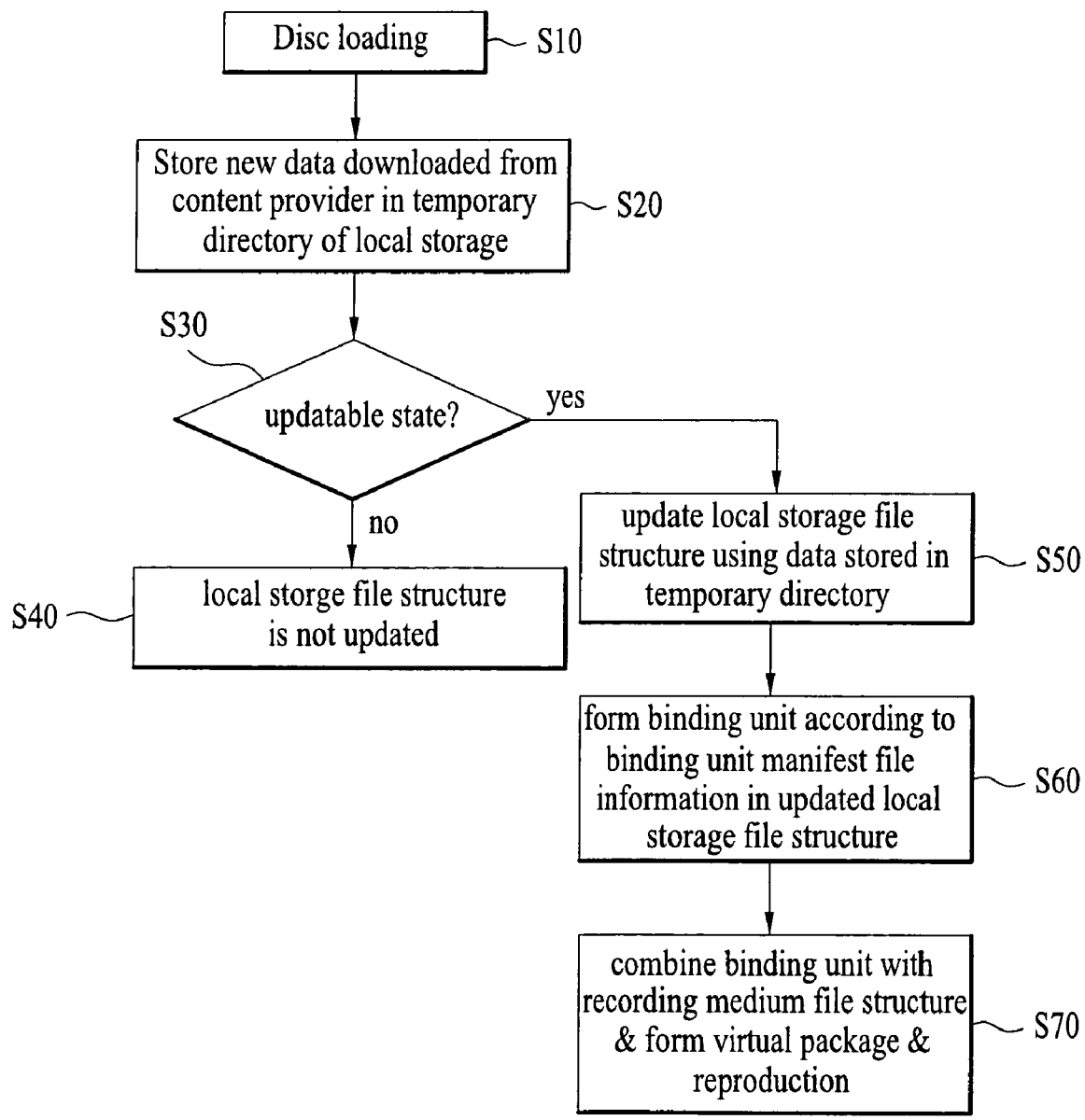
FIG. 10 is a flow chart illustrating a method for reproducing data from a recording medium using a local storage according to the present invention.

FIG. 10 is a flow chart illustrating a method for reproducing data from a recording medium using a local storage according to the present invention.

Referring to FIG. 10, if a disc is loaded in an optical recording/reproducing device, the optical recording/reproducing device recognizes disc ID information (disc_ID) in data of the local storage. If an external content provider (CP) provides new additional data over the Internet or a communication network, the new additional data is downloaded in the local storage at step S10. In this case, the new additional data is indicative of another data received from a content provider (CP), except for old downloaded data.

The above-mentioned new additional data is temporarily stored in a temporary area of the local storage at step S20.

The optical recording/reproducing device determines whether the above-mentioned temporarily-stored additional data is updated to the local storage file structure at step S30. In other words, the optical recording/reproducing device performs verification of the newly-downloaded additional data. The above-mentioned update operation is performed only when there is no verification error. If a player performs a reproduction function although there is no verification error (i.e., if the player enters a player active state), it is obvious to those skilled in the art that the above-mentioned update operation cannot be performed.

If the above-mentioned update operation is unavailable at step S30, the newly-downloaded additional data is not updated to the local storage file structure at step S40. In other words, the optical recording/reproducing device continuously uses a conventional virtual package.

If the above-mentioned update operation is available at step S30, the local storage file structure is updated at step S50 using data which has been stored in the temporary area contained in the local storage at step S20.

The binding unit is formed in the updated local storage file structure according to information of the binding unit manifest file at step S60. In this case, the information of the above-mentioned binding unit manifest file files may include name mapping information as previously stated above.

The binding unit formed at step S60 is combined with the recording medium file structure, such that a virtual package is formed. The optical recording/reproducing device simultaneously reproduces original data stored in the recording medium and additional data downloaded from an external part according to the above-mentioned formed virtual package at step S70.

Figure 11:
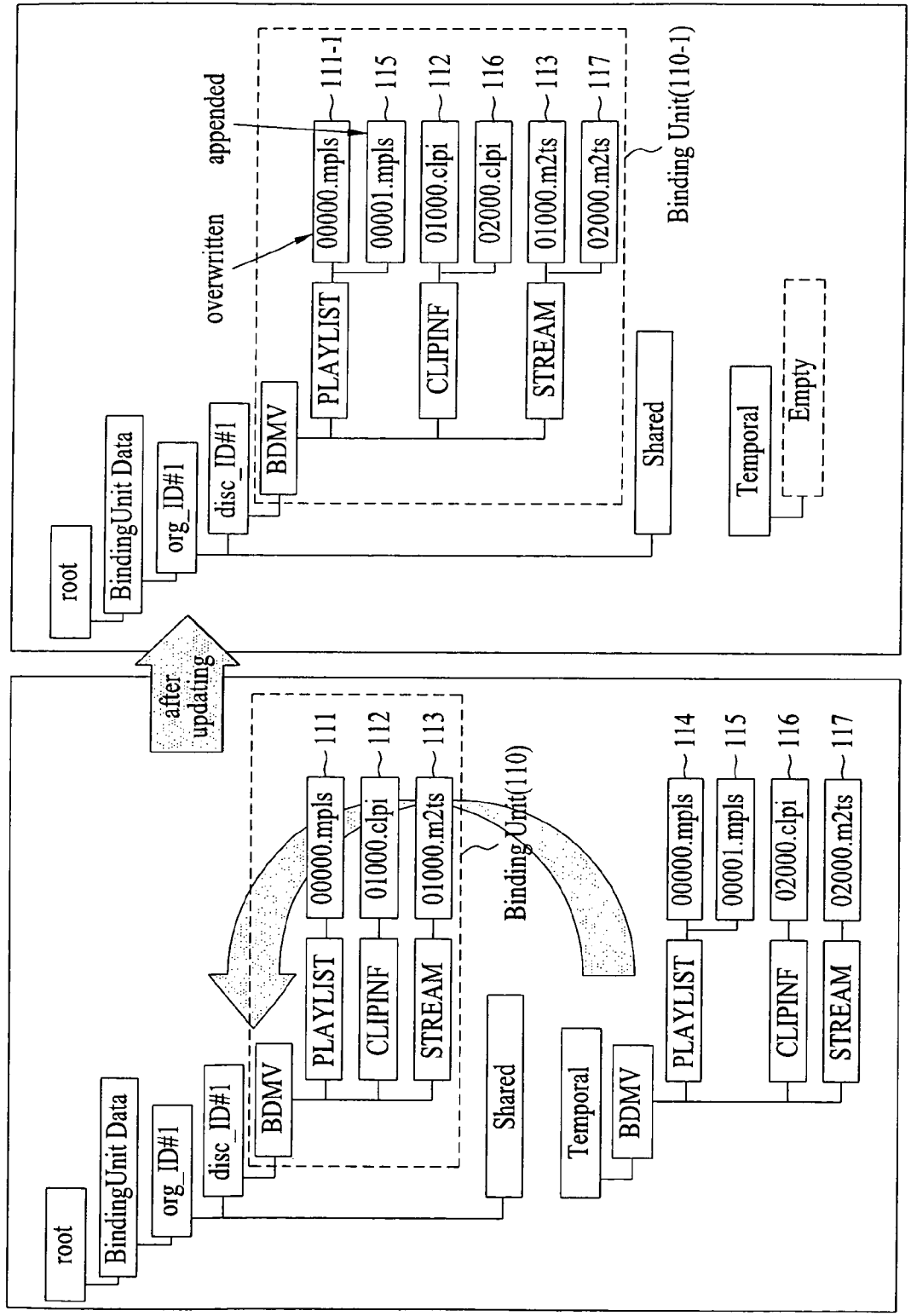
FIG. 11 is a conceptual diagram illustrating a method for downloading/updating data from/to a local storage in disc units in accordance with a first preferred embodiment of the present invention.
Figure 12:
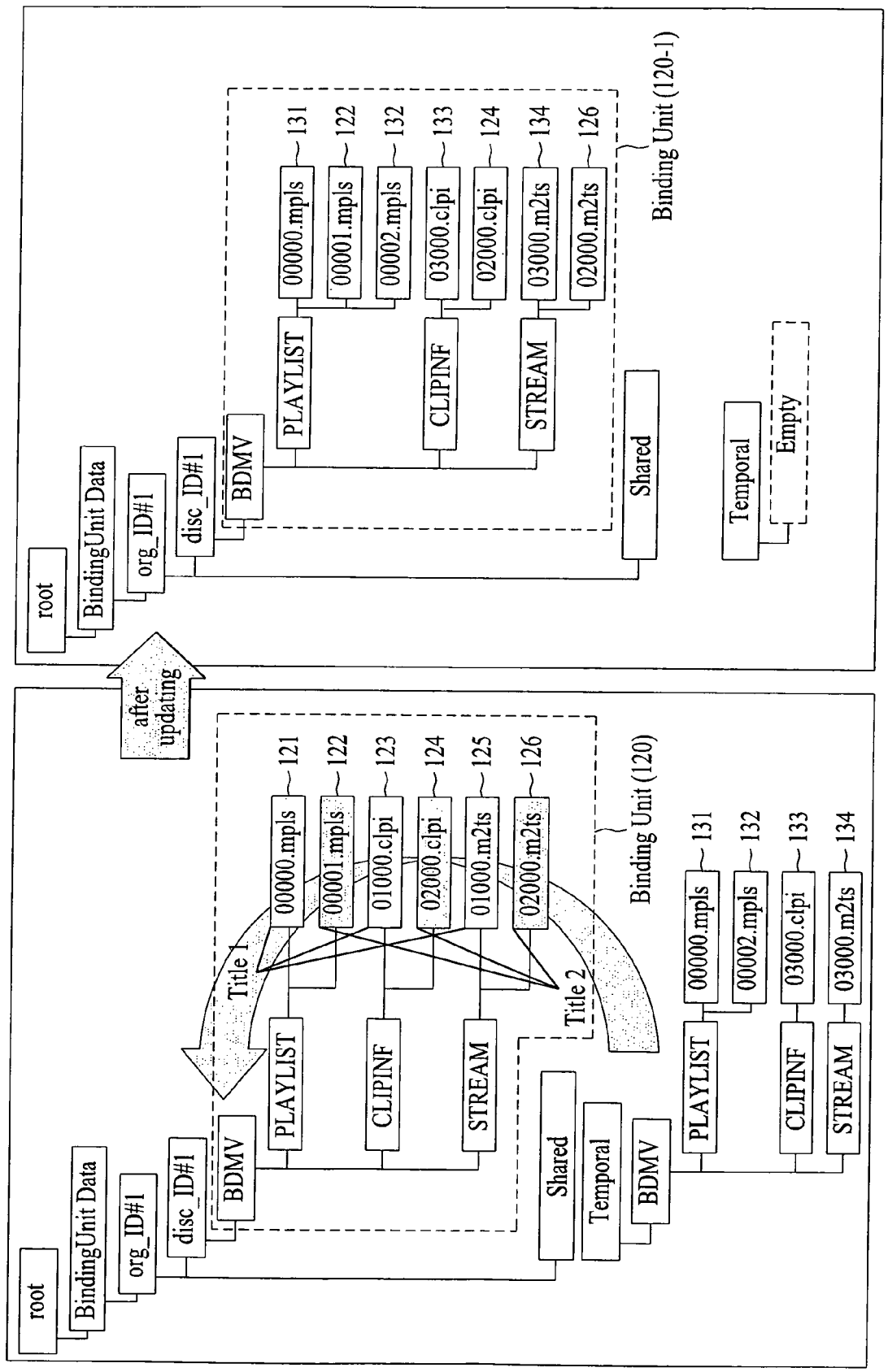
FIG. 12 is a conceptual diagram illustrating a method for downloading/updating data from/to a local storage in title units in accordance with a second preferred embodiment of the present invention.
Figure 13:
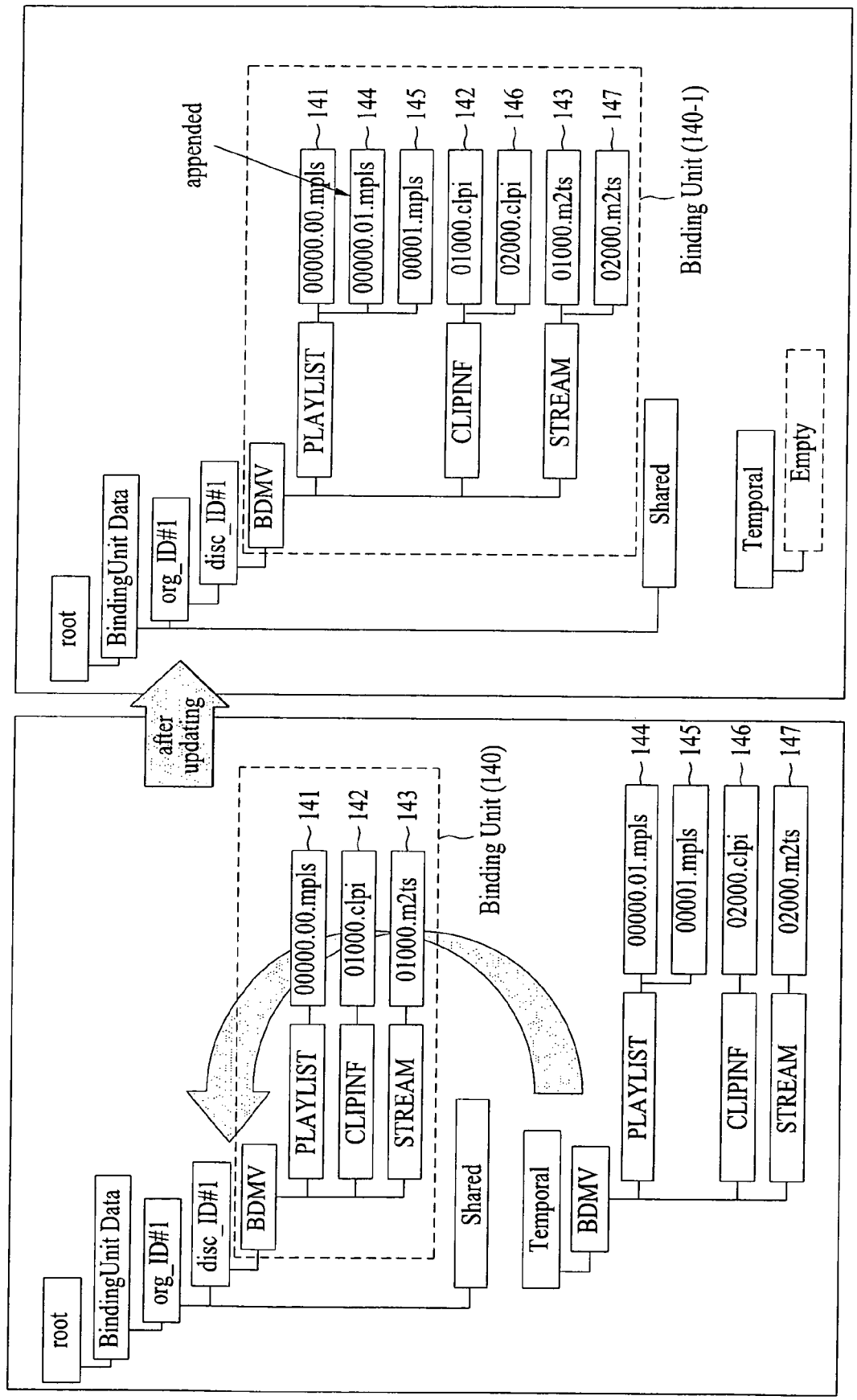
FIG. 13 is a conceptual diagram illustrating a method for downloading/updating data from/to a local storage in content units in accordance with a third preferred embodiment of the present invention.

In association with a method for downloading new data, and updating the downloaded data to a file structure of the local storage binding unit, a preferred embodiment in which the file structure of the local storage file structure is configured in disc units (i.e., per disc), another preferred embodiment in which the file structure of the local storage file structure is configured in title units (i.e., per title), and a still another preferred embodiment in which the file structure of the local storage file structure is configured in content units (i.e., per content) will hereinafter be described with reference to FIGS. 11-13.

FIG. 11 is a conceptual diagram illustrating a method for downloading/updating data from/to a local storage in disc units in accordance with a first preferred embodiment of the present invention.

Referring to FIG. 11, the local storage includes a binding unit directory (BindingUnitData) including binding units, and a temporary directory acting as a temporary area for temporarily storing data downloaded from an external content provider.

An "org_ID" directory for each content provider equal to a disc author is contained in a lower directory of the above-mentioned binding unit directory (BindingUnitData), and the "org_ID" directory includes a disc unique directory (disc_ID) of a disc shared directory (Shared).

As can be seen from FIG. 11, a BD directory (BDMV) indicative of the binding unit 110 is arranged under the disc directory (disc_ID #1), and the binding unit 110 is configured in disc units.

The binding unit 110 includes a playlist directory (PLAYLIST) equipped with a playlist file (00000.mpls) 111, a clip-info directory (CLIPINF) equipped with a clip-info file (01000.clpi) 112, a stream directory (STREAM) equipped with a stream file (01000.m2ts) 113 in the BD directory (BDMV). In this case, the first preferred embodiment of FIG. 11 is characterized in that the above-mentioned files 111, 112, and 113 contained in the above-mentioned directories (PLAYLIST, CLIPINF, and STREAM) are configured in disc units.

In order to perform the above-mentioned download/update operations, a download application of the optical recording/reproducing device recognizes a current binding unit 110 of the disc unique directory (disc_ID #1) and/or a current binding unit 110 of the disc shared directory (Shared), and reports the recognized current binding unit information to an external content provider (CP)

Based on the above-mentioned report result of the download application, the content provider (CP) provides a plurality of database files (e.g., an index table, an object file (MovieObject), and a playlist (PLayList), etc.), and the download application of the optical recording/reproducing downloads the files of the content provider (CP) in a temporary directory for a specific disc. In this case, it is preferable that the above-mentioned download application is determined to be a BD-J application.

The newly-downloaded files contained in the above-mentioned temporary directory are indicative of a playlist directory (PLAYLIST) equipped with a playlist file (00000.mpls) 114 and a playlist file (00001.mpls) 115, a clip-info directory (CLIPINF) equipped with a clip-info file (02000.clpi) 116, and a stream directory (STREAM) equipped with a stream file (02000.m2ts) 117.

In association with the above-mentioned description, the files 114, 115, 116, and 117 contained in the above-mentioned directories (PLAYLIST, CLIPINF, and STREAM) are configured in disc units, and are updated to the above-mentioned binding unit 110.

If the download application sends an update request of the virtual file system (VFS) after data is downloaded in the temporary directory, a resident application of the optical recording/reproducing device moves files of the temporary directory to an associated directory contained in the disc directory (disc_ID #1), such that the binding unit 110 is updated.

In association with the above-mentioned description, the virtual file system does not enter an active state while the optical recording/reproducing device reproduces titles, and updates the binding unit while the optical recording/reproducing device reproduces the titles.

If files contained in the binding unit 110 have the same file names as those of files of the temporary directory during the above-mentioned update operation, the files of the temporary directory is overwritten on the files of the binding unit 110. Otherwise, if the files contained in the binding unit 110 have file names different from those of files of the temporary directory during the above-mentioned update operation, the files of the temporary directory is appended (or added) to files of the binding unit 110.

For example, if a playlist file (00000.mpls) 114 having the same file name as that of the playlist file (00000.mpls) 111 of the binding unit 110, and a playlist file (00001.mpls) 115 having a file name different from that of the playlist file (00000.mpls) 111 of the binding unit 110 are required to be updated to the playlist file (00000.mpls) 111 of the binding unit 110, the playlist file of the playlist directory (PLAYLIST) contained in a binding unit 110-1 formed after the above-mentioned update operation is performed includes a playlist file (00000.mpls) 111-1 formed by the above-mentioned overwriting action and a playlist file (00001.mpls) 15 formed by the above-mentioned appending action.

The clip-info file and the stream file contained in the binding unit 110-1 formed after the update operation is performed are configured by adding the file of the temporary directory to the file of the binding unit 110, respectively. As a result, the clip-info directory (CLIPINF) of the binding unit 110-1 includes a clip-info file (01000.clpi) 112 and another clip-info file (02000.clpi) 116, and the stream directory (STREAM) of the binding unit 110-1 includes a stream file (01000.m2ts) 113 and another stream file (02000.m2ts) 117.

In association with the above-mentioned description, the temporary directory formed after the update operation is performed becomes empty, and the empty state of the temporary directory is maintained until new data is re-downloaded in the temporary directory.

FIG. 12 is a conceptual diagram illustrating a method for downloading/updating data from/to a local storage in title units in accordance with a second preferred embodiment of the present invention.

Although basic directory structures of FIG. 12 are equal to those of FIG. 11, files contained in individual directories of the local storage binding unit 120 are classified according to individual titles, differently from the above-mentioned first preferred embodiment shown in FIG. 11. A detailed description of the second preferred embodiment will hereinafter be described with reference to FIG. 12.

Referring to FIG. 12, a disc unique directory (disc_ID #1) and a disc shared directory (Shared) are contained in the "org_ID #1" directory for each content provider (CP). The BD directory (BDMV) indicative of the binding unit 120 is arranged under the disc unique directory (disc_ID #1), and files of the binding unit 120 designated by the BD directory (BDMV) are classified according individual title units (e.g., "Title 1" and "Title 2", . . . ).

The binding unit 120 of the local storage includes a playlist directory (PLAYLIST) equipped with a playlist file (00000.mpls) 121, a clip-info directory (CLIPINF) equipped with a clip-info file (01000.clpi) 123 and a clip-info file (02000.clpi) 124, and a stream directory (STREAM)

equipped with a stream file (01000.m2ts) 125 and a stream file (02000.m2ts) 126 in the BD directory (BDMV).

For example, specific files (i.e., 00000.mpls (121), 01000.clpi (123), and 01000.m2ts (125)) from among files contained in the above-mentioned directories (PLAYLIST, CLIPINF, and STREAM) are indicative of files of the first title (i.e., Title 1), and the remaining files (i.e., 00001.mpls (122), 02000.clpi (124), and 02000.m2ts (126)) contained in the above-mentioned directories (PLAYLIST, CLIPINF, and STREAM) are indicative of files of the second title (i.e., Title 2).

In association with the above-mentioned description, when data is downloaded in the local storage, it is preferable that specific information indicating whether files of the binding unit 120 contained in the local storage are equal to specific title files is downloaded in the local storage along with information associated with titles.

If a user selects a binding unit to be downloaded for a specific title (e.g., "Title 1"), a download application of the optical recording/reproducing device downloads files of a new binding unit for the above-mentioned "Title 1" selected by the user in the temporary directory. In this case, it is preferable that the above-mentioned download application is determined to be a BD-J application.

For example, the newly-downloaded files stored in the temporary directory are indicative of a playlist directory (PLAYLIST) equipped with a playlist file (00000.mpls) 131 and a playlist file (00002.mpls) 132, a clip-info directory (CLIPINF) equipped with a clip-info file (03000.clpi) 133, and a stream directory (STREAM) equipped with a stream file (03000.m2ts) 134. In this case, the above-mentioned files are composed of files associated with the "Title 1", and are updated to the binding unit 120.

If the download application sends an update request of the virtual file system (VFS) after data is downloaded in the temporary directory, a resident application of the optical recording/reproducing device moves files of the temporary directory to a lower directory contained in the disc directory (disc_ID #1), such that the binding unit 120 is updated.

In association with the above-mentioned description, the virtual file system does not enter an active state while the optical recording/reproducing device reproduces titles, and updates the binding unit while the optical recording/reproducing device reproduces the titles.

During the above-mentioned update operation, files of the "Title 1" from among files of the binding unit 120 are deleted, and are replaced with files of the temporary directory, such that the binding unit 120-1 acquired after the above-mentioned update operation is completed is formed.

In other words, the files of the "Title 1", i.e., the playlist file (00000.mpls) 121, the clip-info file (01000.clpi) 123, and the stream file (01000.m2ts) 125 are deleted. The playlist file is replaced with a playlist file (00000.mpls) 131 and a playlist file (00002.mpls) 132, the clip-info file (01000.clpi) 123 is replaced with another clip-info file (03000.clpi) 133, and the stream file (01000.m2ts) 125 is replaced with another stream file (03000.m2ts) 134, such that the binding unit 120-1 is formed.

Therefore, the binding unit 120-1 formed after the above-mentioned update operation is completed includes the playlist file (00000.mpls) 131 and the playlist file (00001.mpls) 122 in the playlist directory (PLAYLIST). The clip-info directory (CLIPINF) of the binding unit 120-1 includes a clip-info file (03000.clpi) 133 and another clip-info file (02000.clpi) 124, and the stream directory (STREAM) of the binding unit 120-1 includes a stream file (03000.m2ts) 134 and another stream file (02000.m2ts) 126.

In association with the above-mentioned description, the temporary directory formed after the update operation is completed becomes empty, and the empty state of the temporary directory is maintained until new data is re-downloaded in the temporary directory.

FIG. 13 is a conceptual diagram illustrating a method for downloading/updating data from/to a local storage in content units in accordance with a third preferred embodiment of the present invention.

Although basic directory structures of the local storage shown in FIG. 13 are equal to those of FIG. 11, a playlist file of the playlist directory (PLAYLIST) contained in the local storage binding unit 140 is configured in content units, differently from the above-mentioned first and second preferred embodiments shown in FIGS. 11 and 12. A detailed description of the third preferred embodiment will hereinafter be described with reference to FIG. 13.

Referring to FIG. 13, a disc unique directory (disc_ID #1) and a disc shared directory (Shared) are contained in the "org_ID #1" directory for each content provider (CP). The BD directory (BDMV) indicative of the binding unit 140 is arranged under the disc directory (disc_ID #1), and the binding unit 140 designated by the BD directory (BDMV) is configured in content units.

The binding unit 140 of the local storage includes a playlist directory (PLAYLIST) equipped with a playlist file (00000.mpls) 141 of a specific content (e.g., "Content 1"), a clip-info directory (CLIPINF) equipped with a clip-info file (01000.clpi) 142 of the specific content (e.g., "Content 1"), and a stream directory (STREAM) equipped with a stream file (01000.m2ts) 143 of the specific content (e.g., "Content 1")

For example, if a user selects files to be downloaded, the download application downloads database files and stream files supplied from the content provider (CP) in the temporary directory. The above-mentioned database and stream files include partial-, modified-, or complete-information for only one BD-ROM acting as a recording medium. In this case, it is preferable that the above-mentioned download application is determined to be a BD-J application.

For example, as to the newly-downloaded files stored in the temporary directory, the BD directory (BDMV) is located under the temporary directory. The BD directory (BDMV) includes a playlist directory (PLAYLIST) equipped with a playlist file (00000.mpls) 144 and a playlist file (00001.mpls) 145, a clip-info directory (CLIPINF) equipped with a clip-info file (02000.clpi) 146, and a stream directory (STREAM) equipped with a stream file (02000.m2ts) 147. In this case, the above-mentioned files are composed of files associated with a new content (e.g., "Content 2"), and are updated to the binding unit 140.

If the resident application of the optical recording/reproducing device moves files of the temporary directory to a lower directory of the disc unique directory (disc_ID #1), such that the binding unit 140 is updated.

In association with the above-mentioned description, the virtual file system does not enter an active state while the optical recording/reproducing device reproduces titles, and updates the binding unit while the optical recording/reproducing device reproduces the titles.

During the above-mentioned update operation, files of the binding unit 140 remain, and files of the temporary directory are appended (or added), such that the binding unit 140-1 acquired after the above-mentioned update operation is completed is formed.

Therefore, the binding unit 140-1 formed after the above-mentioned update operation is completed includes the playlist file (00000.00.mpls) 141, the playlist file (00000.01.mpls) 144, and the playlist file (00000.01.mpls) 145 in the playlist directory (PLAYLIST). The clip-info directory (CLIPINF) of the binding unit 140-1 includes a clip-info file (01000.clpi) 142 and another clip-info file (02000.clpi) 146, and the stream directory (STREAM) of the binding unit 140-1 includes a stream file (01000.m2ts) 143 and another stream file (02000.m2ts) 147.

The above-mentioned playlist file (00000.00.mpls) 141 is indicative of a pre-downloaded content. For example, the playlist file (00000.00.mpls) 141 acts as a playlist file of a specific content "Content 1". The playlist file (00000.01.mpls) 144 is indicative of a newly-downloaded content, and acts as a playlist file of a specific content "Content 2".

In association with the above-mentioned description, the temporary directory formed after the update operation is completed becomes empty, and the empty state of the temporary directory is maintained until new data is re-downloaded in the temporary directory.

Figure 14:
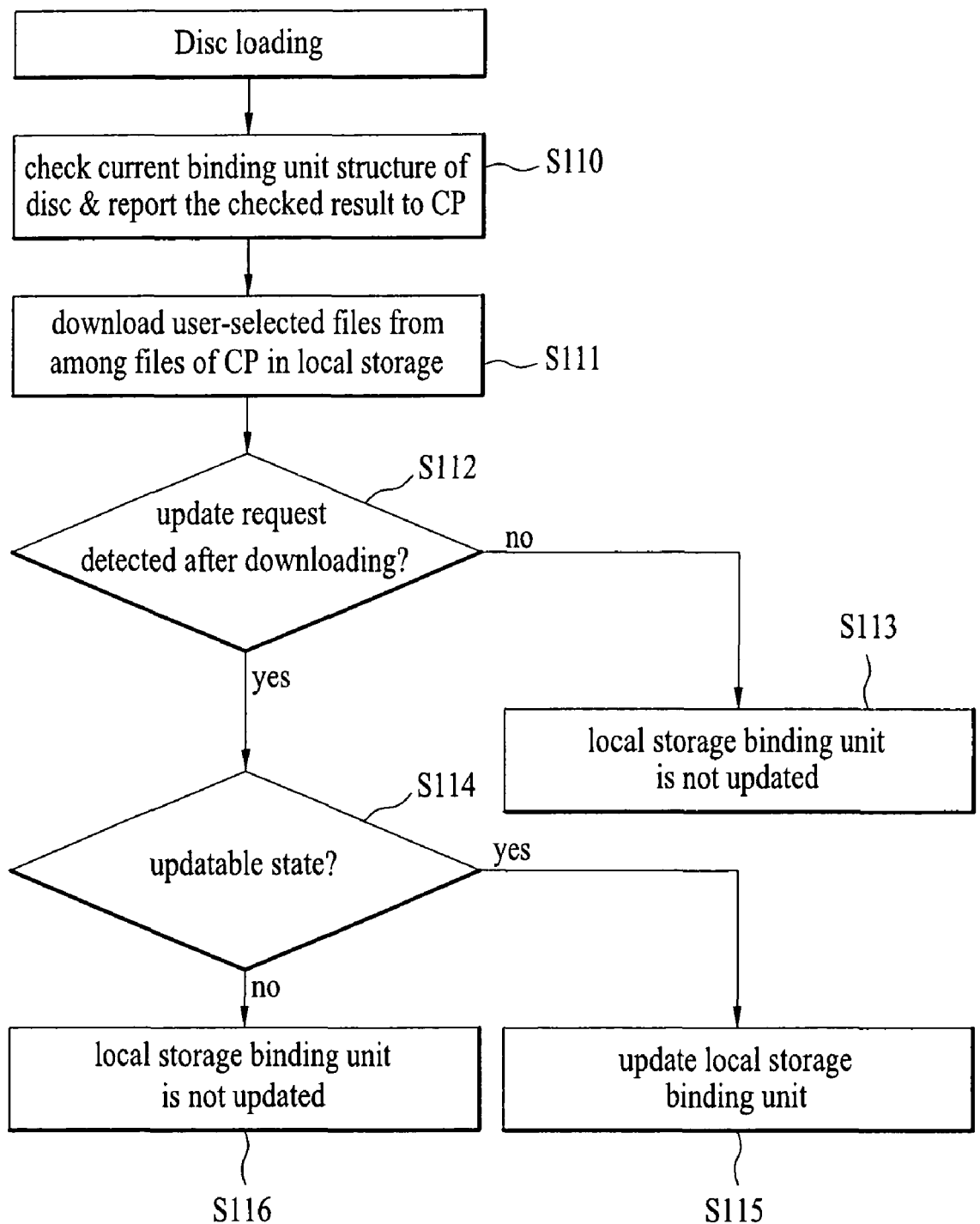
FIG. 14 is a flow chart illustrating a method for downloading/updating data from/to a local storage according to the present invention.

FIG. 14 is a flow chart illustrating a method for downloading/updating data from/to a local storage according to the present invention.

Referring to FIG. 14, if a disc is loaded in an optical recording/reproducing device, the optical recording/reproducing device recognizes a current binding unit structure of the loaded disc, and reports the recognized binding unit structure to the content provider (CP) at step S110. However, provided that the binding structure is configured in title units or content units, the above step S110 may not be necessary.

The optical recording/reproducing device downloads user-selected files from among all files supplied from the content provider (CP) in the local storage at step S111. It should be noted that files to be selected by the user and files to be transmitted from the content provider (CP) may be changed according to the binding unit structure contained in the local storage.

If the above-mentioned download operation is completed at step S111, the optical recording/reproducing device determines the presence or absence of an update request at step S112. In this case, the update request may be indicative of an update request of the virtual file system.

If the absence of the update request is determined at step S112, the optical recording/reproducing device does not update the local storage binding unit at step S113.

Otherwise, if the presence of the update request is determined at step S112, the optical recording/reproducing device determines whether the downloaded data can be updated or not at step S114, such that it can verify whether the downloaded data has no security problem and a current player enters a data reproduction mode. In other words, if there is no verification problem and the player enters a reproduction mode, the optical recording/reproducing device determines that the downloaded data can be updated. Otherwise, if verification problems occur and the player does not enter the reproduction mode, the optical recording/reproducing determines that the downloaded data cannot be updated.

If it is determined that the downloaded data can be updated at step S114, the optical recording/reproducing device updates the local storage binding unit at step S115. Otherwise, if it is determined that the downloaded data cannot be updated at step S114, the optical recording/reproducing device does not update the local storage binding unit at step S116. The updated binding unit at step S115 finally updates a virtual package. Specifically, the update operation of the virtual package encounters the change of title(s), such that the virtual package must be updated when a title is changed to another title.

As apparent from the above description, a method and apparatus for reproducing data from a recording medium using a local storage according to the present invention can effectively reproduce original data recorded in the recording medium and additional data stored in the local storage, resulting in the creation of more convenient functions for a user.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method for reproducing data of a recording medium using a local storage comprising:

downloading data in the local storage storing a first file structure, the downloaded data including a binding unit manifest file which defines a binding unit, the binding unit manifest file including, a list indicating a relationship between files and titles, and name mapping information for performing mapping of the files contained in the binding unit to form a virtual package, the name mapping information including information indicating names and locations of the files contained in the binding unit in the virtual package;

determining whether the first file structure can be updated;

updating the first file structure with the downloaded data if it is determined the first file structure can be updated;

forming the binding unit by using the updated first file structure;

forming the virtual package by combining the formed binding unit with a second file structure contained in the recording medium according to the name mapping information; and reproducing data recorded in the recording medium and/or data stored in the local storage of the formed virtual package, wherein the virtual package includes at least one of a first file from the binding unit replacing a file of the second file structure and a second file added from the binding unit.

2. The method of claim 1, wherein the first file structure is determined to be updated with the downloaded data based on a verification.

3. The method of claim 1, wherein the first file structure is determined to be updated when a player is ready for reproduction of a title.

4. The method of claim 1, wherein the binding unit includes a plurality of read-only files associated with the name mapping information.

5. The method of claim 1, wherein the updating the first file structure includes replacing a binding unit manifest file included in the first file structure with the binding unit manifest file included in the downloaded data.

6. The method of claim 1, wherein the downloaded data is temporarily stored in a temporary area contained in the local storage.

7. The method of claim 6, wherein the data stored in the temporary area is updated to the local storage file structure, and the temporary area becomes empty.

8. The method of claim 1, wherein the downloaded data is added or replaced by a unit of disc.

9. The method of claim 8, wherein the updating includes:
overwriting a file having the same name as that of a conventional file; and
appending another file having a name different from that of the conventional file.

10. The method of claim 8, wherein the updating includes:
deleting old-version files of a title to be updated; and
replacing the old-version files with newly-downloaded files.

11. The method of claim 1, wherein the downloaded data is updated by a unit of content.

12. The method of claim 11, wherein the downloaded files further include partial- and/or modified-information as compared to a file formed before the updating.

13. The method of claim 1, wherein the virtual package is formed by using a virtual file system.

14. An apparatus for reproducing data of a recording medium using a local storage comprising:
a pickup unit configured to read data from the recording medium;
a local storage configured to store downloaded data associated with the recording medium data, the local storage storing a first file structure, the downloaded data including a binding unit manifest file which defines a binding unit, the binding unit manifest file including,
a list indicating a relationship between files and titles, and
name mapping information for performing mapping of the files contained in the binding unit to form a virtual package, the name mapping information including information indicating names and locations of the files contained in the binding unit in the virtual package; and
a controller configured to determine whether the first file structure can be updated, update the first file structure with the downloaded data if the controller determines the first file structure can be updated, form the binding unit using the updated first file structure, form the virtual package by combining the binding unit with a second file structure contained in the recording medium according to the name mapping information, and control a reproduction of data contained in the recording medium and/or data contained in the local storage using the virtual package,
wherein the virtual package includes at least one of a first file from the binding unit replacing a file of the second file structure and a second file added from the binding unit.

15. The apparatus of claim 14, wherein the controller determines whether the first file structure can be updated with the downloaded data by performing a verification.

16. The apparatus of claim 14, wherein the controller determines the first file structure to be updated when a player is ready for reproduction of a title.

17. The apparatus of claim 14, wherein the binding unit includes a plurality of read-only files associated with the name mapping information.

18. The apparatus of claim 17, wherein the controller is further configured to replace a binding unit manifest file included in the first file structure with the binding unit manifest file included in the downloaded data.

* * * * *